United States Patent
Zhang et al.

(10) Patent No.: US 11,874,540 B2
(45) Date of Patent: Jan. 16, 2024

(54) CAPACITOR RESONATOR MODULATOR

(71) Applicant: UNIVERSITY OF SOUTHAMPTON, Hampshire (GB)

(72) Inventors: Weiwei Zhang, Southampton (GB); Graham Reed, Godalming (GB); David Thomson, Southampton (GB); Martin Ebert, Southampton (GB); Shinichi Saito, Southampton (GB)

(73) Assignee: University of Southampton, Hampshire (GB)

( * ) Notice: Subject to any disclaimer, the term of this patent is extended or adjusted under 35 U.S.C. 154(b) by 97 days.

(21) Appl. No.: 17/587,679

(22) Filed: Jan. 28, 2022

(65) Prior Publication Data
US 2022/0244580 A1  Aug. 4, 2022

(30) Foreign Application Priority Data
Jan. 29, 2021 (GB) .................................. 2101277

(51) Int. Cl.
*G02F 1/025* (2006.01)

(52) U.S. Cl.
CPC .......... *G02F 1/025* (2013.01); *G02F 2202/06* (2013.01)

(58) Field of Classification Search
CPC ................. G02F 1/025; G02F 2202/06; G02F 2201/063; G02F 2203/15; G02F 1/2257
See application file for complete search history.

(56) References Cited

U.S. PATENT DOCUMENTS

| | | | |
|---|---|---|---|
| 7,764,850 B2 | 7/2010 | Bratkovski et al. | |
| 8,798,406 B1 | 8/2014 | Hochberg et al. | |
| 9,142,698 B1* | 9/2015 | Cunningham | .... H01L 21/26513 |
| 9,411,177 B2* | 8/2016 | Cunningham | ........ G02F 1/0018 |
| 10,509,244 B1* | 12/2019 | Shank | ................... G02F 1/0147 |
| 2011/0293216 A1 | 12/2011 | Lipson et al. | |
| 2015/0063741 A1* | 3/2015 | Menezo | ................ H01S 3/0085 |
| | | | 385/2 |
| 2015/0323450 A1 | 11/2015 | Lipson et al. | |
| 2016/0139487 A1* | 5/2016 | Popovic | ............. G02B 6/29395 |
| | | | 385/2 |
| 2017/0102563 A1* | 4/2017 | Luo | .................... G02B 6/12004 |
| 2018/0284561 A1* | 10/2018 | Phare | ...................... G02F 1/035 |
| 2019/0250434 A1 | 8/2019 | Debnath et al. | |
| 2020/0059068 A1* | 2/2020 | Cohen | ..................... H01S 5/124 |
| 2022/0206323 A1* | 6/2022 | Gevorgyan | ............. G02F 1/025 |
| 2022/0221743 A1* | 7/2022 | Gupta | ..................... G02F 1/025 |
| 2022/0244580 A1* | 8/2022 | Zhang | .................... G02F 1/025 |

(Continued)

FOREIGN PATENT DOCUMENTS

WO  WO2018/029466 A1  2/2018

OTHER PUBLICATIONS

International Search Report and Written Opinion, International Application No. PCT/EP2022/052141 dated May 18, 2022, 16 pages.

(Continued)

*Primary Examiner* — Andrew Jordan
(74) *Attorney, Agent, or Firm* — Quarles & Brady LLP

(57) ABSTRACT

A resonator modulator for modulating light in a photonic circuit, the modulator comprising: a capacitor formed of a ring-shaped insulating region sandwiched between an outer conductive region and an inner conductive region, wherein at least one of the outer conductive regions or the inner conductive regions is a polycrystalline semiconductor material.

29 Claims, 14 Drawing Sheets

(56) References Cited

U.S. PATENT DOCUMENTS

| | | | | |
|---|---|---|---|---|
| 2023/0296831 A1* | 9/2023 | Cheung | .............. | G02B 6/12004 385/2 |
| 2023/0296956 A1* | 9/2023 | Datta | ..................... | G02F 1/035 385/3 |

OTHER PUBLICATIONS

Dubray et al., "Electro-Optical Ring Modulator: An Ultracompact Model for the Comparison and Optimization of p-n, p-i-n, and Capacitive Junction." IEEE Journal of Selected Topics in Quantum Electronics, vol. 22, No. 6 (2016), 10 pages.

Douix et al., "Low loss poly-silicon for high performance capacitive silicon modulators." Optics Express, vol. 26, No. 5 (2018): 5983-5990, 9 pages.

Abraham et al., "Low-voltage and low-loss silicon modulator based on carrier accumulation using a vertical slot waveguide." IEEE 12th International Conference on Group IV Photonics (2015); 118-119, 2 pages.

Van Campenhout, Joris, et al. "Low-voltage, low-loss, multi-Gb/s silicon micro-ring modulator based on a MOS capacitor." Optical Fiber Communication Conference. Optical Society of America, 2012.

Deng, Qingzhong, et al. "Strip-slot waveguide mode converter based on symmetric multimode interference." Optics letters 39.19 (2014): 5665-5668.

Säynätjoki, Antti, et al. "Low-loss silicon slot waveguides and couplers fabricated with optical lithography and atomic layer deposition." Optics express 19.27 (2011): 26275-26282.

Palmer, R., et al. "Low-loss silicon strip-to-slot mode converters." IEEE Photonics Journal 5.1 (2013): 2200409-2200409.

Wang, Zhechao, et al. "Ultracompact low-loss coupler between strip and slot waveguides." Optics letters 34.10 (2009): 1498-1500.

Phatak, Abhijeet, et al. "Design of electro-optic modulators based on graphene-on-silicon slot waveguides." Optics letters 41.11 (2016): 2501-2504.

T. Christopoulos et al., "Low-power bistability in graphene-comprising 3D photonic resonant circuits" Journal of Applied Physics, 122, 2017.

Jie Sun et al., "A 128 Gb/s PAM4 Silicon Microring Modulator with Integrated Thermo-Optic Resonance Tuning" Journal of Lightwave technology, vol. 37, No. 1, Jan. 2019.

Stefan Abel et al., "Large Pockels effect in micro- and nanostructured barium titanate integrated on silicon" Nature Materials, vol. 18, Jan. 2019.

S. Andreou et al., "Slot waveguide microring modulator on InP membrane" Proceedings Symposium IEEE Photonics Society Benelux, 2015, Brussels, Belgium.

Michael Gould et al., "Silicon-polymer hybrid slot waveguide ring-resonator modulator" Optics Express, vol. 19, No. 5, Feb. 28, 2011.

Wim Bogaerts et al., "Silicon microring resonators" Laser Photonics Reviews, vol. 6, No. 1, p. 47-73 (2012).

Lily Weng et al., "Optical Ring Modulator ModSpec Compact Model" Presentation Aug. 31, 2016.

Zhang, Weiwei, Samuel Serna, Xavier Le Roux, Carlos Alonso-Ramos, Laurent Vivien, and Eric Cassan. "Analysis of silicon-on-insulator slot waveguide ring resonators targeting high Q-factors." Optics letters 40, No. 23 (2015): 5566-5569.

Zhang, W., Serna, S., Le Roux, X., Vivien, L. and Cassan, E., 2016. Highly sensitive refractive index sensing by fast detuning the critical coupling condition of slot waveguide ring resonators. Optics letters, 41(3), pp. 532-535.

Lee, Jong-Moo, Duk-Jun Kim, Gwan-Ha Kim, O-Kyun Kwon, Kap-Joong Kim, and Gyungock Kim "Controlling temperature dependence of silicon waveguide using slot structure." Optics express 16, No. 3 (2008): 1645-1652.

Baehr-Jones, Tom, Michael Hochberg, Chris Walker, and Axel Scherer. "High-Q optical resonators in silicon-on-insulator-based slot waveguides." Applied Physics Letters 86, No. 8 (2005): 081101.

UKIPO Search Report, GB Application No. 2101277.8, dated Jul. 15, 2021, 3 pages.

* cited by examiner

CAPACITOR RESONATOR MODULATOR

CROSS-REFERENCES TO RELATED APPLICATIONS

This application claims priority to GB 2101277.8 (the "277.8 Application"), filed Jan. 29, 2021, by Weiwei Zhang et al. entitled, "A Capacitor Resonator Modulator," the disclosure of which is incorporated herein by reference in its entirety for all purposes.

FIELD OF THE INVENTION

The present invention relates to a capacitor resonator modulator and a method of fabricating a capacitor resonator modulator.

BACKGROUND OF THE INVENTION

Modulating light efficiently for data communication is a key function in integrated photonics.

Ring-shaped (or simply "ring") resonator modulators are often used due the fact that light can be delayed or trapped for a certain time within a ring shape. They are used to reduce the electrically loaded capacitances from photonics structures composed of PN junctions or capacitors, due the fact that light can be delayed or trapped for a certain time in the ring. Ring resonators therefore advantageously have a reduced footprint compared to a linear device for the same optical path length, and power consumption for the modulator is also reduced for the same reason. Ring resonator modulators are therefore important in use within photonic circuits for modulating the light propagating in the photonic waveguide circuits.

PN-junction type ring resonator modulators are known in the art to operate by varying a depletion region located between p-doped and n-doped regions in order to modulate bandwidths. For example, changing an applied bias voltage across a PN-junction modulator changes the width of the depletion region, which in turn changes the refractive index of the waveguide material (e.g. integrated silicon) and subsequently the resonance wavelength through the plasma dispersion effect.

A disadvantage of PN-junction ring resonators is that they require an application of a reverse (or inverse) voltage bias voltage (e.g. using assisted bandwidth improvement circuits) in order to widen the depletion region in order to achieve modulation bandwidths larger than 5 GHz. Another disadvantage is that the fabrication of PN junctions are hard to manufacture as they require precise ion implantation to set the junction exactly around optical mode centre region, otherwise, the modulation efficiency will be ill-suited in comparison with the design.

In contrast to PN-junction ring resonator modulators, in capacitor modulators it is only the insulator oxide thickness that is effectively "tuned". Advantageously, the doping level in the waveguide/resonator core of capacitor modulators does not require high doping concentrations, and thus the insertion losses of light are relatively small. Further advantageously, the doping level can be increased on the slab region in order to adjust the resistance without losing much light. In contrast, PN-junction ring resonator modulators often require excess doping concentrations in the core waveguides in order to increase the modulation efficiency, which can cause larger insertion losses of the laser light at a detriment to the performance of that modulator.

In contrast to PN-junction-type ring resonator modulators, capacitor-type ring resonator modulators (hereafter referred to as "capacitor ring resonator modulators") work differently. They comprise waveguides with cross-sections formed of a semiconductor-insulator-semiconductor 'sandwich'. In accordance with an applied potential difference, free charge carries (e.g. electrons and holes) move from the semiconductor material and towards the insulator layer. However, the free charge carriers cannot pass through the insulator layer embedded in the waveguide centre, so the carrier charges instead accumulate on two semiconductor/insulator interfaces, allowing efficient light modulation by carrier variations. In other words, when a voltage is applied across the waveguide (e.g. in accordance with the input modulation signal), charge accumulates on either side of the insulating layer, producing a change in refractive index of the waveguide, which in turn modulates the propagating light in accordance with the modulating signal.

It is known in Shin et al. (WO2018/029466 A1) that a capacitor ring resonator modulator may be formed by directly (or fully) etching single crystal silicon (also known as monocrystalline silicon), however single crystal silicon must be grown from a crystalline seed layer (also known as a "silicon seed") in order for the silicon crystal to grow from that seed layer. It is also known in Shin et al. that ring resonators may be formed by initially depositing a layer of polysilicon or amorphous silicon, and then applying a crystallisation step, typically by annealing, in order to recrystallize the polysilicon layer once it has been deposited.

The prior art methods of manufacturing modulators involve multiple intermediate manufacturing steps, which are time consuming, costly, and burdensome to perform. The manufacture of capacitor ring resonator modulators by directly etching single crystal silicon has many drawbacks. A drawback is that the etching process requires very sharp etching tips, which are themselves difficult and costly to produce. Moreover, the dimensions of the capacitor ring resonator modulator being made are limited to the dimensions of the etching tip used, such that the capacitor slot is limited to being no smaller than 20 nm in width. Limits to the dimensions of these modulators subsequently limits their application or use.

It is with these problems in mind that the inventors have devised the present invention.

SUMMARY OF THE INVENTION

Accordingly, the present invention aims to solve the above problems by providing, according to a first aspect, a resonator modulator for modulating light in a photonic circuit, the modulator comprising: a capacitor formed of a ring-shaped insulating region sandwiched between an outer conductive region and an inner conductive region, wherein at least one of the outer conductive regions or the inner conductive is a polycrystalline semiconductor material.

The fact that the finished modulator product contains a polycrystalline material is important and goes against the teaching of the prior art (e.g. Shin et al.). This is contrary to the teaching in the prior art. By manufacturing a device with polycrystalline materials, any intermediate crystallisation steps can be avoided, therefore resulting in a device that is cheaper and easier to make. The inventors have discovered that, surprisingly, a fully functional resonator modulator can be produced even without these crystallisation steps.

Optional features of the invention will now be set out. These are applicable singly or in any combination with any aspect of the invention.

In one embodiment of the invention, the polycrystalline semiconductor material comprises polysilicon, Si1-xGex, or a group III-V semiconductor material.

The group III-V semiconductor material may include one of: InP, or InGaAsP.

The inner conductive region may comprise a polycrystalline inner disk and the outer conductive region may comprise a crystalline semiconductor outer ring.

A semiconductor crystalline material should be understood to correspond to a material whose constituents are arranged in a highly ordered structure. An example of such a material is any single crystal material such as silicon, or a single crystalline III-V material.

In another embodiment, the outer conductive region comprises an outer waveguide portion and a conductive outer slab.

Typically, the conductive outer slab extends laterally outwards from the ring-shaped insulating region. In some embodiments, the outer slab may be a single ring-shaped slab extending around the circumference of the resonator. It may merge with a slab portion of an input/output waveguide.

The inner conductive region may comprise a ring-shaped inner waveguide portion and a ring-shaped conductive inner slab.

The ring-shaped conductive inner slab may define a hole in the conductive material of the inner conductive region, and the hole may extend to the underlaying layer.

In another embodiment of the invention, the inner conductive region comprises a layer of oxide material on an inner disk of a crystalline material, and the outer conductive region comprises a polycrystalline outer ring.

In some embodiments, the oxide material may be silicon dioxide.

The polycrystalline outer ring may comprise a ring waveguide portion.

The polycrystalline outer material may further comprise a ring-shaped slab portion. The polycrystalline outer ring may be formed by depositing and subsequent etching of polycrystalline material. Alternatively, it may be formed by etching and then subsequently depositing a polycrystalline material.

In another embodiment of the invention, the layer of oxide material has a ring shape, defining a central hole region filled with a deposited semiconductor material.

The inner disk and the oxide material may be etched to form a conductive inner waveguide and a conductive inner slab portion.

The modulator may be optically coupled to one or two or more an waveguides. In an example embodiment, the two or more waveguides may be an input waveguide and an output waveguide.

In some embodiments, the waveguide may comprise either silicon, or silicon and silicon dioxide.

The outer conductive region may be electrically coupled to a first pair of electrodes and the inner conductive region may be electrically coupled to a second pair of electrodes.

The modulator may further comprise a cladding layer configured to encapsulate the insulating region, the outer conductive region, and the inner conductive region.

The inner conductive region may further comprise a doped region, wherein the doped region is electrically coupled, via a first contact and a second contact, to the second pair of electrodes, and wherein the doped region is configured to generate heat in response to a voltage applied across the second pair of electrodes.

In another embodiment of the invention, the doped region comprises: doped silicon, doped Si1-xGex, doped InP, or doped InGaAsP.

According to another aspect of the invention, there is a method of fabricating the resonator modulator of the previous statements, the method comprising the following steps:

i) providing a substrate, the substrate comprising a semiconductor layer on a underlaying layer on a semiconductor substrate layer;

ii) depositing or growing an insulating layer onto the semiconductor layer, iii) etching through the insulating layer and the semiconductor layer to the underlaying layer to form a well, the well comprising an inner wall and a base formed by the underlaying layer;

iv) depositing or growing an insulating material onto the inner wall to form a ring-shaped insulating region;

v) depositing a polycrystalline semiconductor material onto the insulating region to fill the well, and vi) a planarising step comprising removing a portion of the polycrystalline semiconductor material and the insulating layer to form a capacitor comprising the ring-shaped insulating region sandwiched between an outer conductive region and an inner conductive region, wherein the inner conductive region is formed of the polycrystalline semiconductor material and the outer conductive region is formed of the crystalline material.

Advantageously, depositing or growing the insulating material onto the inner wall in order to form a ring-shaped insulating region allows for a better control of the thickness of the ring-shaped insulating region, and better control of the angle it makes with the underlaying layer. By controlling the thickness and/or the angle in this way, an optimisation of the modulator's efficiency can be achieved.

The polycrystalline semiconductor material may comprise polysilicon, Si1-xGex, or a group III-V semiconductor material.

The group III-V semiconductor material may include one of: InP, or InGaAsP.

The method may further comprise:

vii) a step of etching the outer conductive region to form an outer waveguide portion and a conductive outer slab, and wherein the inner conductive region is left un-etched to form a conductive polycrystalline inner disk.

Advantageously, the inner conductive region is not etched in order to keep a thicker polycrystalline inner disk in the centre. This can reduce the resistance to injected carriers into the capacitor quicker in comparison with etched versions. With shallow etched slab on two sides, the modulator's shape is a micro-disk. Further advantageously, micro-disk resonators have less optical losses and a higher Q-factor.

In another embodiment, the method may further comprise:

viii) a step of etching the inner conductive region to form a ring-shaped conductive inner slab and a hole extending to the underlaying layer.

The method may further comprise:

ix) a step of depositing a cladding layer to encapsulate the insulating region, the outer conductive region, and the inner conductive region, x) a step of etching vias through the cladding layer and exposing a surface of the conductive outer slab and the ring-shaped conductive inner slab.

The method may further comprise:

xi) a step of depositing a layer of metal into the vias, and xii) a step of etching the layer of metal to form at least one electrode in each via.

According to another aspect of the invention, there is a method of fabricating the resonator modulator of the previous statements, the method comprising the following steps:
  i) providing a substrate, the substrate comprising a semiconductor layer on a underlaying layer on a semiconductor substrate layer;
  ii) depositing or growing an insulating layer onto the semiconductor layer,
  iii) etching through the insulating layer and the semiconductor layer to the underlaying layer to form an outer trench and an inner disk of crystalline material, the inner disk comprising an outer wall surrounded by the outer trench;
  iv) depositing or growing an insulating material onto the outer wall to form a ring-shaped insulating region;
  v) depositing a polycrystalline semiconductor material onto the insulating region to fill the outer trench and cover the insulating layer, and
  vi) a planarising step comprising removing a portion of the polycrystalline semiconductor material down to the level of the insulating layer to form a capacitor comprising the ring-shaped insulating region sandwiched between an outer conductive region and an inner conductive region, wherein the outer conductive region is formed of the polycrystalline semiconductor material and the inner conductive region is formed of the crystalline material.

The polycrystalline semiconductor material may comprise polysilicon, Si1-xGex, or a group III-V semiconductor material.

The group III-V semiconductor material may include one of: InP, or InGaAsP.

The method may further comprise the step of etching the outer conductive region to form a conductive outer rib waveguide and a conductive outer slab portion.

The method may further comprise the step of etching the inner conductive region to form a conductive inner rib waveguide and a conductive inner slab portion.

After method step iv) of one of the previous statements, the method may comprise the following steps:
  v) etching a hole in the insulating layer, the hole extending to the inner disk,
  vi) depositing the polycrystalline semiconductor material to fill the hole and partially fill the outer trench,
  vii) etching away the polycrystalline semiconductor material in the hole, and
  viii) a planarising step that removes the polycrystalline semiconductor material down to the level of the insulating layer to form a capacitor comprising the ring-shaped insulating region sandwiched between an outer conductive region and an inner conductive region, wherein the outer conductive region is formed of the polycrystalline semiconductor material and the inner conductive region is formed of the crystalline material.

The semiconductor layer may comprise a layer of silicon, the underlaying layer may comprise a layer of silicon dioxide or a BOX layer, and the semiconductor substrate layer may comprise a layer of silicon, collectively forming a silicon-on-insulator (SOI) wafer. In some embodiments the previously discussed SOI wafer may be a double-layer SOI platform.

BRIEF DESCRIPTION OF THE DRAWINGS

Embodiments of the invention will now be described by way of example with reference to the accompanying drawings in which:

FIG. 7b shows a section of view of the resonator modulator shown in FIG. 7a.

FIG. 8 shows a plan view of a resonator modulator according to one embodiment.

FIG. 8b shows a section of view of the resonator modulator shown in FIG. 8a.

DETAILED DESCRIPTION AND FURTHER OPTIONAL FEATURES OF THE INVENTION

Aspects and embodiments of the present invention will now be discussed with reference to the accompanying figures. Further aspects and embodiments will be apparent to those skilled in the art. All documents mentioned in this text are incorporated herein by reference.

Figure 1:
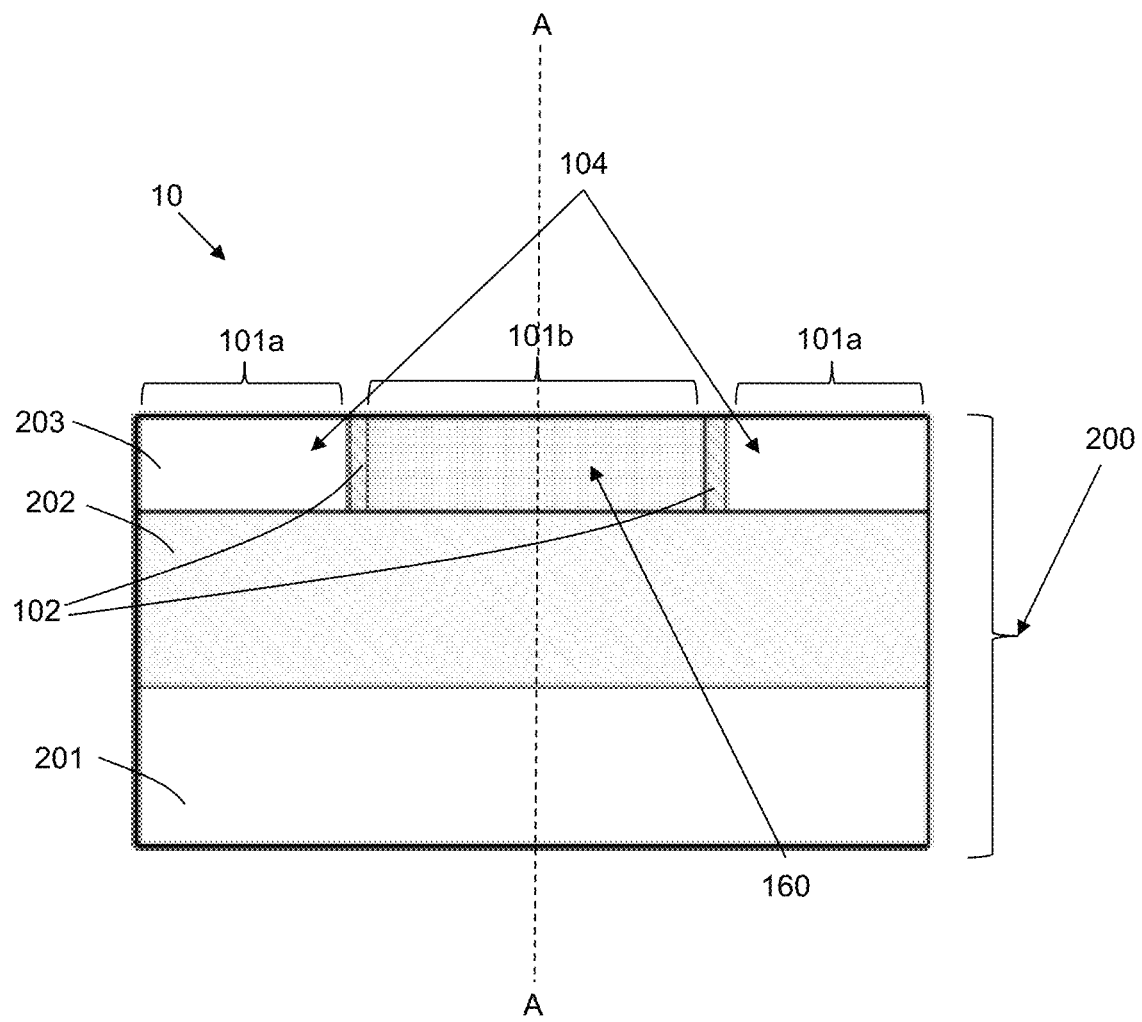
FIG. 1 shows a section view of a resonator modulator according to one embodiment where the inner conductive region comprises a polycrystalline inner disk and the outer conductive region comprises a crystalline semiconductor outer ring.

FIG. 1 is a cross-sectional view of a resonator modulator (10) for modulating light in a photonic circuit in accordance with one embodiment. The modulator (10) comprises: a capacitor formed of a ring-shaped insulating region (102) sandwiched between an outer conductive region (101a) and an inner conductive region (101b). At least one of the outer (101a) conductive regions or the inner conductive regions (101b) is a polycrystalline semiconductor material.

The resonator modulator (10) comprises a body (200) comprising a semiconductor layer (203), an underlaying layer (202), and a semiconductor substrate layer (201). A bottom surface of the modulator (10) is the surface that is closest to the semiconductor substrate layer (201). A top surface of the modulator (10) is the surface that is farthest from the semiconductor substrate layer (201), and closest to the semiconductor layer (203). In this way, the body (200) comprises the semiconductor layer (203) on the underlaying layer (202) on a semiconductor substrate layer (201).

Referring to FIG. 1, the ring-shaped insulating region (102) is sandwiched between an outer conductive region (101a) and an inner conductive region (101b) located at the top surface of the modulator (10). A radial axis of the ring-shaped insulating region (102) points into and out of the page of FIG. 1, such that only two regions (annotated as "102") of the ring-shaped insulating region (102) are visible in the cross-sectional view of the modulator (10) shown in FIG. 1. The height of the modulator (10) is measured in a direction away from the semiconductor substrate layer (201), towards the top surface of the modulator (10), and along a central axis A of the modulator (10) (axis is dashed line "A" in FIG. 1). The width of the modulator (10) is measured in a direction perpendicular to the height and the central axis A. The length of the modulator (10) is measured in a direction perpendicular to the central axis A and is parallel to the direction of the radial axis of the ring-shaped insulating region (102).

As shown in FIG. 1, at the top surface of the modulator (10), the ring-shaped insulating region (102) separates the inner conductive region (101b) from the outer conductive region (101a). The inner conductive region (101b) is an inner disk (160) and the outer conductive region (101a) is an outer ring (104), such that the inner disk (160), the ring-shaped insulating region (102), and the outer ring (104) all share the same radial axis and are concentrically aligned at the top surface of the modulator (10) around the central axis A.

In the embodiment shown in FIG. 1, the inner conductive region (101b) is formed of a polycrystalline semiconductor material, and the outer conductive region (101a) is formed of a semiconductor crystalline material. As the skilled person will appreciate, a semiconductor crystalline material should be understood to correspond to any semiconductor material whose constituents are arranged in a highly ordered structure. An example of such a material is any single crystal material such as (single crystal) silicon, or a single crystalline III-V material. In this way, the modulator (10) contains a polycrystalline material, which goes against the teaching of the prior art (e.g. Shin et al). By manufacturing a modulator (10) whereby the inner disk (160) is formed of a polycrystalline material, any intermediate crystallisation steps are avoided in its manufacturing process, therefore resulting in a modulator (10) that is cheaper and easier to make. The inventors have discovered that, going against the standard practices in the art, a fully functional resonator modulator (10) that can be produced without the need for any crystallisation or re-crystallisation steps, such as annealing for example.

In this way, the inner conductive region (101b) comprises a polycrystalline inner disk (160) and the outer conductive region (101a) comprises a crystalline semiconductor outer ring (104). In another embodiment of the modulator (10), the polycrystalline semiconductor material is polysilicon or Si1-xGex, or is a group III-V semiconductor material. In yet another embodiment, the group III-V semiconductor material includes one of: InP, or InGaAsP.

Figure 2:
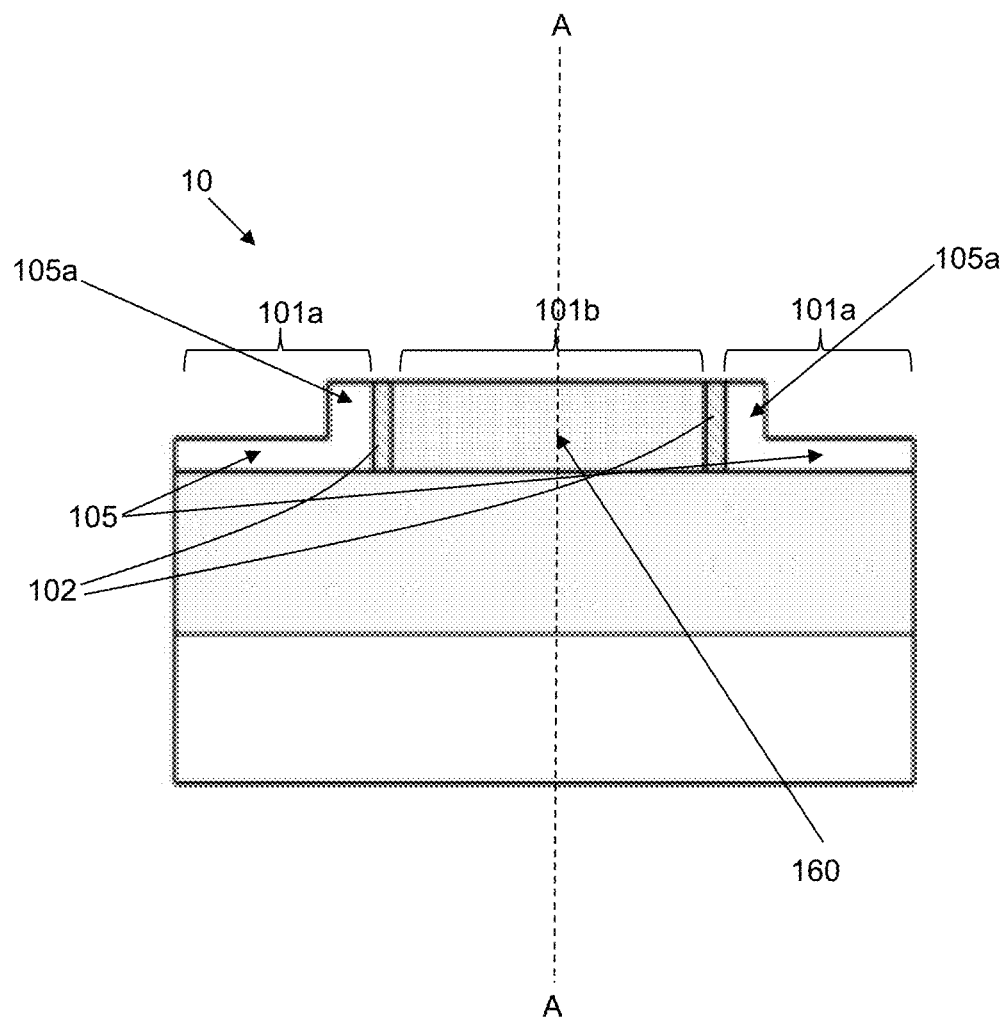
FIG. 2 shows a section view of a resonator modulator according to another embodiment comprising an outer waveguide portion and a conductive outer slab.

FIG. 2 is a cross-sectional view of a resonator modulator (10) according to another embodiment of the invention, and can be formed via a modification of the embodiment shown in FIG. 1. Referring to FIG. 2, at the top surface of the modulator (10), the ring-shaped insulating region (102) separates the inner conductive region (101b) from the outer conductive region (101a). In this way, the inner disk (160), the ring-shaped insulating region (102), and the outer conductive region (101a) all share the same radial axis and are concentrically aligned at the top surface of the modulator (10) around the central axis A. In the embodiment shown in FIG. 2, the inner conductive region (101b) is an inner disk (160), whereas the outer conductive region (101b) comprises an outer waveguide portion (105a) and a conductive outer slab (105). The outer waveguide portion (105a) is located adjacent to the ring-shaped insulating region (102), and concentrically surrounds both the inner disk (160) and the ring-shaped insulating region (102). The outer waveguide portion (105a) has a height equal to, or approximately equal to, that of the ring-shaped insulating region (102). The conductive outer slab (105) is a lateral extension of the outer waveguide portion (105a), such that it extends laterally outwards away from the outer waveguide portion (105a) in a direction perpendicular to (and away from) the central axis A. In this way, the conductive outer slab (105) extends laterally outwards from the ring-shaped insulating region (102).

The conductive outer slab (105) has a height that is stepped to be lower than both the height of the outer waveguide portion (105a) and the height of the ring-shaped insulating region (102). In some embodiments, the conductive outer slab (105) is a single ring-shaped slab extending around the circumference of the modulator (10). In other embodiments, the conductive outer slab (105) merges with a slab portion of one or two or more waveguides. In an example embodiment, the two waveguides may be an input and an output waveguide (not shown in FIG. 2).

Figure 3:
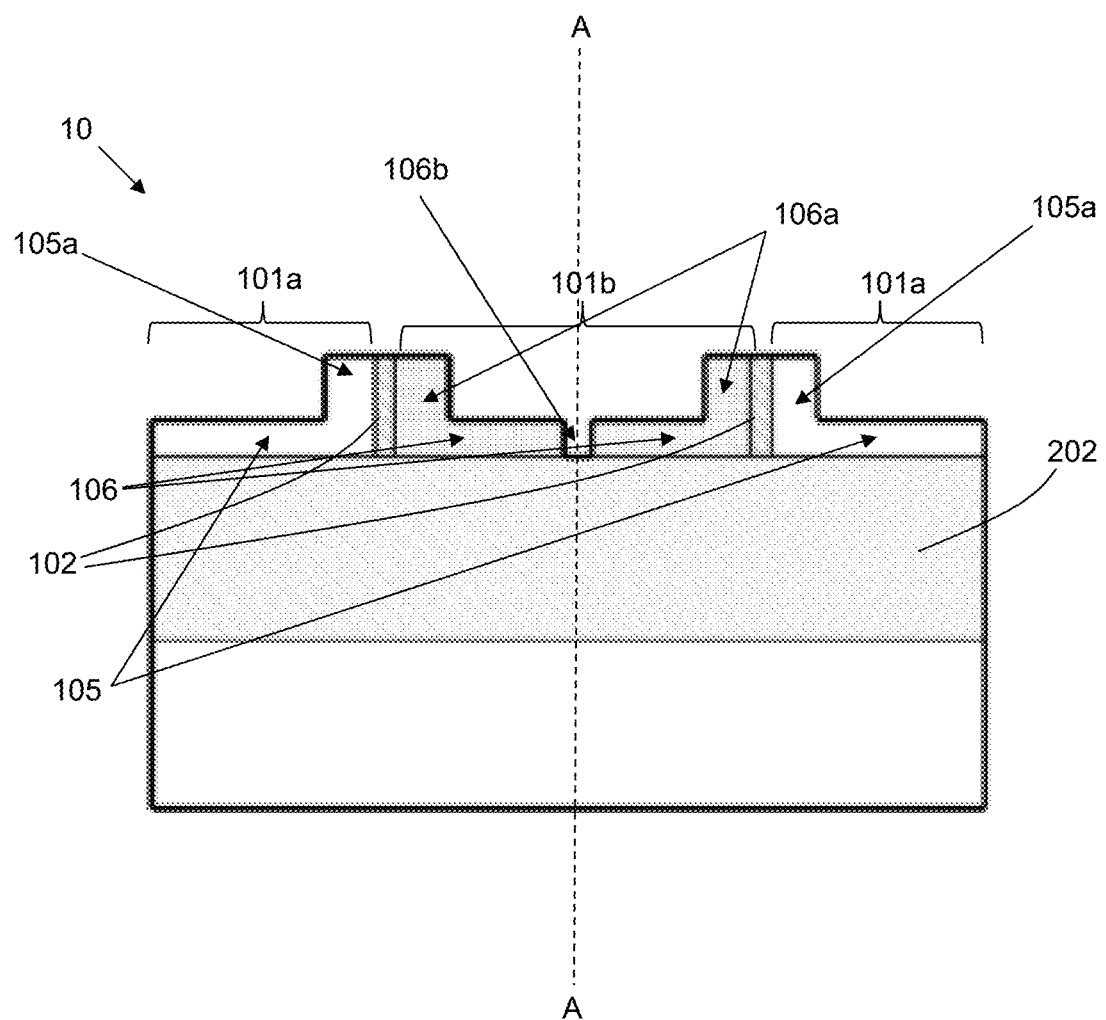
FIG. 3 shows a section view of a resonator modulator according to another embodiment where the inner conductive region comprises a ring-shaped waveguide portion and a ring-shaped conductive inner slab.

FIG. 3 is a cross-sectional view of a resonator modulator (10) according to another embodiment of the invention, and can be formed via a modification of the embodiment shown in FIG. 2. The embodiment shown in FIG. 3 has the same conductive outer slab (105) and the same outer waveguide portion (105a) as previously described for the embodiment shown in FIG. 2. In the embodiment shown in FIG. 3, the inner conductive region (101b) comprises a ring-shaped inner waveguide portion (106a) and a ring-shaped conductive inner slab (106). The inner waveguide portion (106a) is located adjacent to the ring-shaped insulating region (102) and is concentrically surrounded by the ring-shaped insulating region (102). The ring-shaped inner waveguide portion (106a) has a height equal to, or approximately equal to, that of the ring-shaped insulating region (102). The ring-shaped conductive inner slab (106) is a lateral extension of the ring-shaped inner waveguide portion (106a), such that it extends away from the ring-shaped inner waveguide portion (106a) in a direction perpendicular to and towards the central axis A. The ring-shaped conductive inner slab (106) has a height that is stepped to be lower than both the height of the ring-shaped inner waveguide portion (106a) and the height of the ring-shaped insulating region (102). Referring to FIG. 3, the ring-shaped conductive inner slab (106) defines a hole (106b) in the conductive material of the inner conductive region (101b). The hole (106b) extends to the underlaying layer (202), and the sides of the hole (106a) are formed by the ring-shaped conductive inner slab (106). The hole (106b) is an optional feature of the resonator modulator (10), such that in another embodiment (not shown in FIG. 3), there may be no hole (106b) located between the ring-shaped conductive inner slab (106).

In the embodiments shown in FIG. 1, FIG. 2, and FIG. 3, the polycrystalline inner disk (160), may be formed by depositing and subsequent etching of the polycrystalline material.

Figure 4:
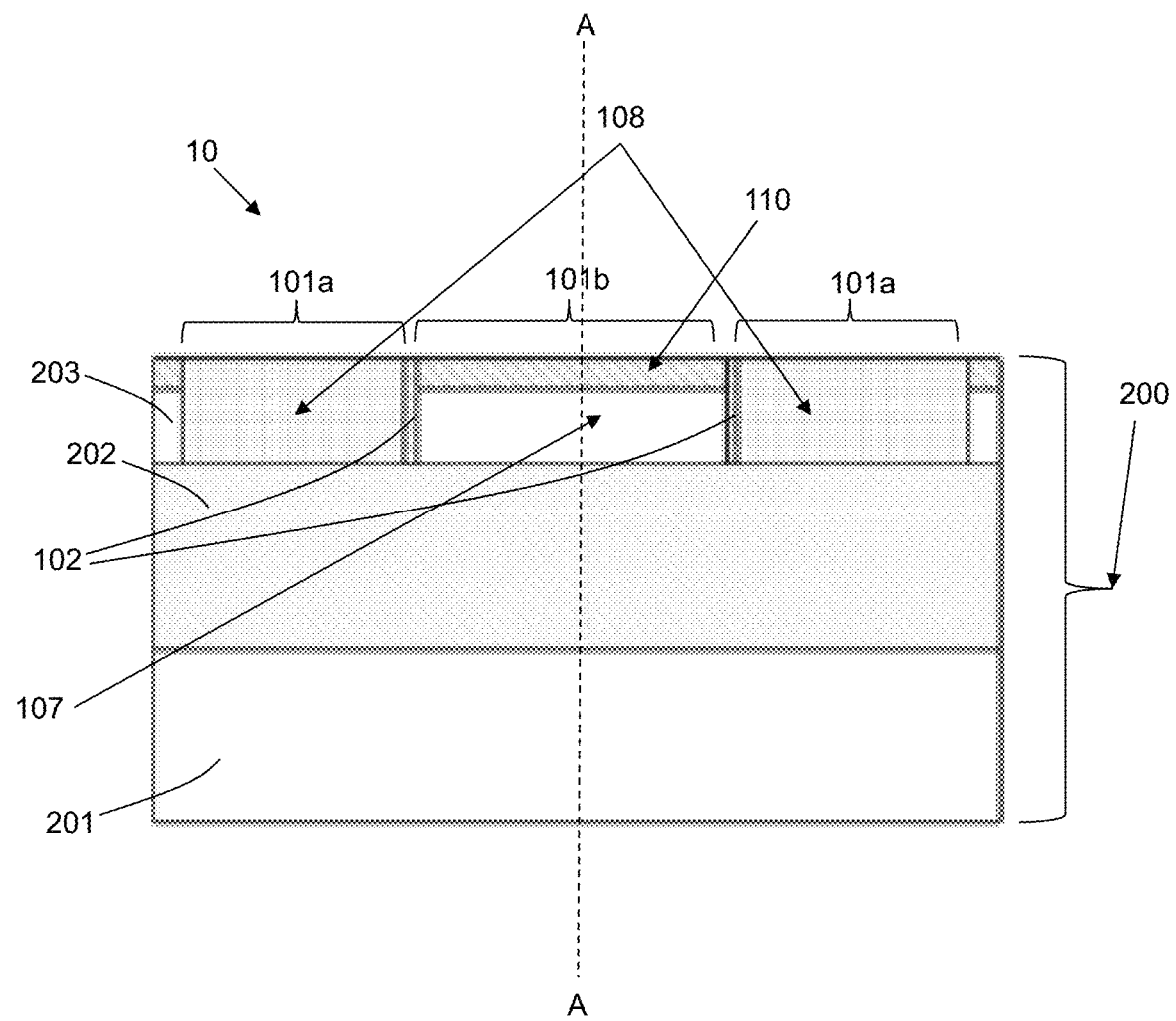
FIG. 4 shows a section view of a resonator modulator according to another embodiment comprising a layer of oxide material on an inner disk of a crystalline material, and the outer conductive region comprises a polycrystalline outer ring.

FIG. 4 is a cross-sectional view of a resonator modulator (10) according to another embodiment of the invention. Similar to embodiments shown in FIGS. 1 to 3, the resonator modulator (10) in the embodiment shown in FIG. 4 comprises a body (200) comprising a semiconductor layer (203), an underlaying layer (202), and a semiconductor substrate layer (201). A bottom surface of the modulator (10) is the surface that is closest to the semiconductor substrate layer (201). A top surface of the modulator (10) is the surface that is farthest from the semiconductor substrate layer (201), and closest to the semiconductor layer (203). In this way, the body (200) comprises the semiconductor layer (203) on the underlaying layer (202) on a semiconductor substrate layer (201).

Referring to FIG. 4, the ring-shaped insulating region (102) is sandwiched between an outer conductive region (101a) and an inner conductive region (101b) located at the top surface of the modulator (10). A radial axis of the ring-shaped insulating region (102) points into and out of the page of FIG. 4, such that only two regions (annotated as "102") of the ring-shaped insulating region (102) are visible in the cross-sectional view of the modulator (10) shown in FIG. 4. The height of the modulator (10) is measured in a direction away from the semiconductor substrate layer (201), towards the top surface of the modulator (10), and along a central axis A of the modulator (10) (axis is dashed line "A" in FIG. 4). A width of the modulator (10) is measured in a direction perpendicular to the height and the central axis A. A length of the modulator (10) is measured in a direction perpendicular to the central axis A and is parallel to the direction of the radial axis of the ring-shaped insulating region (102).

At the top surface of the modulator (10), the ring-shaped insulating region (102) separates the inner conductive region (101b) from the outer conductive region (101a). In this embodiment, the inner conductive region (101b) comprises a layer of oxide material (110) on an inner disk (107) of a crystalline material, and the outer conductive region (101a) comprises a polycrystalline outer ring (108). In this way, the inner disk (107), the ring-shaped insulating region (102), and the outer conductive region (101a) all share the same radial axis and are concentrically aligned at the top surface of the modulator (10) around the central axis A.

In the embodiment shown in FIG. 4, the outer conductive region (101a) (as opposed to the inner conductive region (101b) shown in FIG. 1) is formed of a polycrystalline semiconductor material, and the inner conductive region (101b) (as opposed to the outer conductive region (101a) shown in FIG. 1) is formed of a semiconductor crystalline material. In this way, the embodiment shown in FIG. 4 can be thought of as being the inverse of the embodiment shown in FIG. 1, as it has a polycrystalline outer ring (108) and inner disk of a crystalline material (107) (as opposed to having a crystalline outer ring (104) and a polycrystalline inner disk (160), as is the case in the embodiment shown in FIG. 1).

As the skilled person will appreciate, a semiconductor crystalline material should be understood to correspond to any semiconductor material whose constituents are arranged in a highly ordered structure. An example of such a material is any single crystal material such as (single crystal) silicon, or a single crystalline III-V material. In this way, the modulator (10) contains a polycrystalline material, which goes against the teaching of the prior art (e.g. Shin et al). By manufacturing a modulator (10) whereby the outer ring (108) is formed of a polycrystalline material, any intermediate crystallisation steps are avoided in its manufacturing process, therefore resulting in a modulator (10) that is cheaper and easier to make. The inventors have discovered that a fully functional resonator modulator (10) that can be produced without the need for any crystallisation or re-crystallisation steps, such as annealing for example.

Figure 5A:
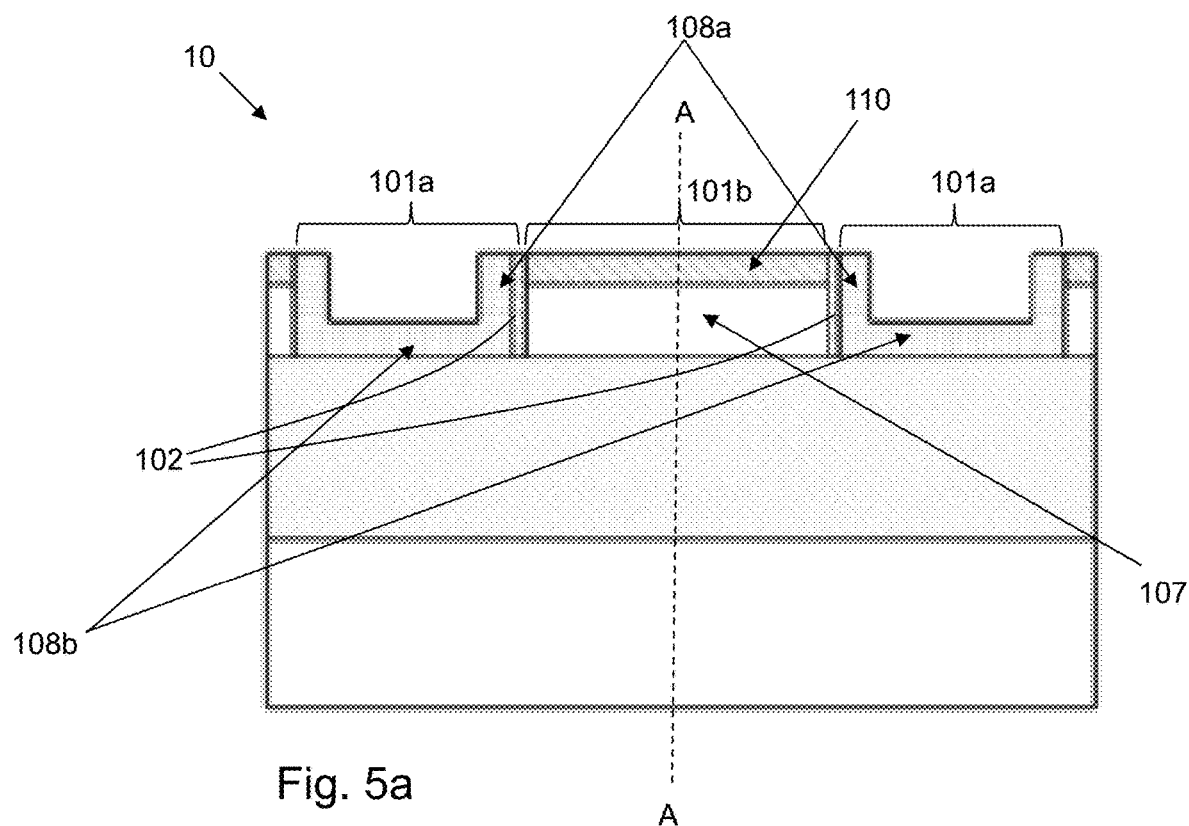
FIG. 5a shows a section view of a resonator modulator according to another embodiment where the polycrystalline outer ring comprises a ring-shaped slab portion.

FIG. 5a is a cross-sectional view of a resonator modulator (10) according to another embodiment of the invention, and can be formed via a modification of the embodiment shown in FIG. 4. As is the case in the embodiment shown in FIG. 4, referring to FIG. 5a, the inner conductive region (101b) also comprises a layer of oxide material (110) on an inner disk (107) of a crystalline material, and the outer conductive region (101a) also comprises a polycrystalline outer ring (108). In the embodiment shown in FIG. 5a, the polycrystalline outer ring (108) comprises a ring waveguide portion (108a). The ring waveguide portion (108a) is located adjacent to the ring-shaped insulating region (102), and concentrically surrounds both the inner disk (107) and the ring-shaped insulating region (102). The ring waveguide portion (108a) has a height equal to that of the ring-shaped insulating region (102). The polycrystalline outer ring (108) further comprises a ring-shaped slab portion (108b). The ring-shaped slab portion (108b) is a lateral extension of the ring waveguide portion (108a), such that it extends laterally outwards away from the ring waveguide portion (108a) in a direction perpendicular to (and away from) the central axis A. In this way, the ring-shaped slab portion (108b) extends laterally outwards from the ring-shaped insulating region (102).

Figure 5B:
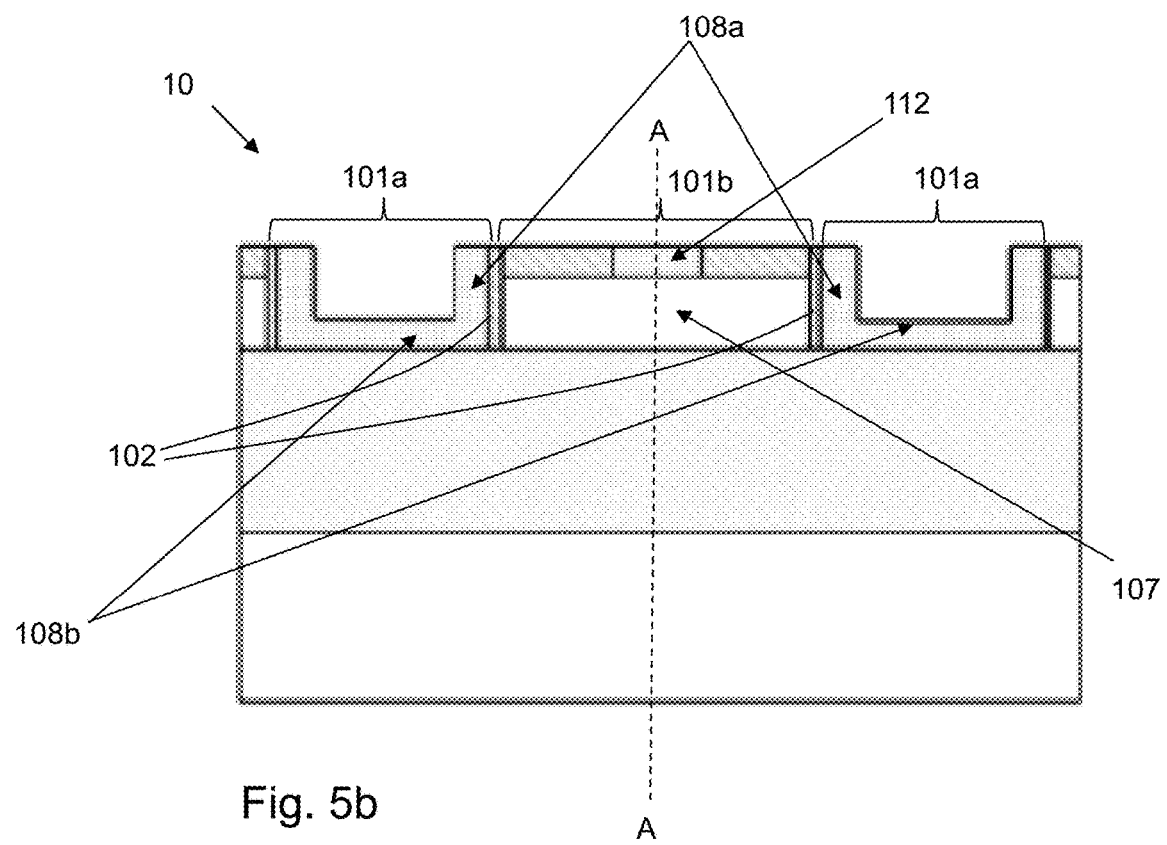
FIG. 5b shows a section view of a resonator modulator according to another embodiment where the layer of oxide material has a ring shape, defining a central hole region filled with a deposited semiconductor material.

FIG. 5b is a cross-sectional view of a resonator modulator (10) according to another embodiment of the invention, and can formed via a modification of the embodiments shown in FIG. 4 and FIG. 5a.

In the embodiment shown in FIG. 5b, the layer of oxide material (110) has a ring shape, defining a central hole region (112) filled with a deposited semiconductor material. In the embodiments shown in FIG. 4, FIG. 5a, and FIG. 5b, the polycrystalline outer ring (108) may be formed by depositing and subsequent etching of the polycrystalline material in the outer ring (108) in order to form the ring waveguide portion (108a) and the ring-shaped slab portion (108b). Alternatively, it may be formed by etching and then subsequently depositing the polycrystalline material. In one embodiment, the central hole region (112) shown in FIG. 5b is filled a semiconductor material which is the same polycrystalline material that also forms the outer ring (108), the ring waveguide portion (108a), and the ring-shaped slab portion (108b).

Figure 6:
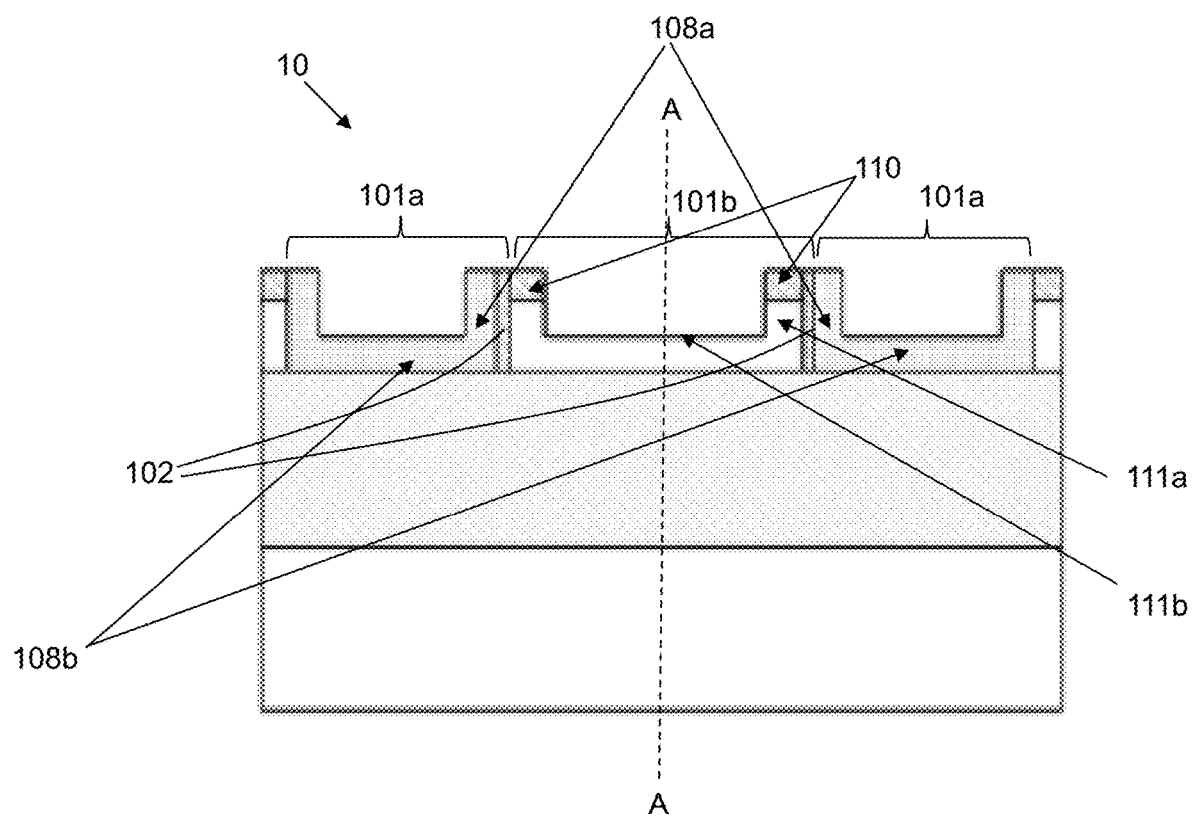
FIG. 6 shows a section view of a resonator modulator according to another embodiment where the inner disk and the layer of silicon dioxide are etched to form a conductive inner waveguide and a conductive inner slab portion.

FIG. 6 is a cross-sectional view of a resonator modulator (10) according to another embodiment of the invention, and can formed via a modification of the embodiments shown in FIG. 5a and FIG. 5b.

As previously described for the embodiments shown in FIG. 5a and FIG. 5b, in the embodiment shown in FIG. 6, the polycrystalline outer ring (108) also comprises a ring waveguide portion (108a) and a ring-shaped slab portion (108b). In the embodiment shown in FIG. 6, the inner disk (107) and the oxide material (110) (as are shown in the embodiments illustrated in FIG. 5a and FIG. 5b) are themselves etched to form a conductive inner waveguide (111a) and a conductive inner slab portion (111b). The conductive inner waveguide (111a) is located adjacent to the ring-shaped insulating region (102) and is concentrically surrounded by the ring-shaped insulating region (102). The conductive inner waveguide (111a) retains un-etched portions of the oxide material (110) on it, and has a (combined) height equal to that of the ring-shaped insulating region (102). The inner slab portion (111b) is a lateral extension of the inner waveguide (111a), such that it extends away from the inner waveguide (111a) in a direction perpendicular to and towards the central axis A. The inner slab portion (111b) has a height that is stepped to be lower than both the height of the inner waveguide (111a) and the height of the ring-shaped insulating region (102). In some embodiments, the oxide material (110) is silicon dioxide.

Figure 7A:
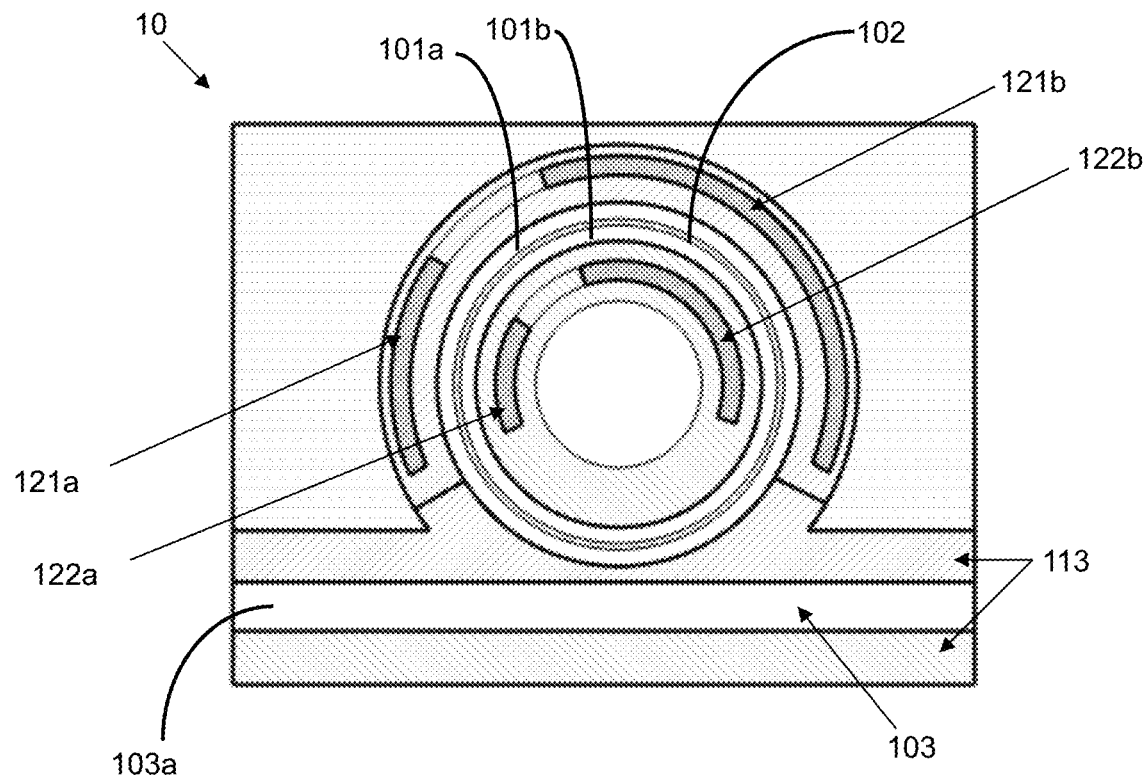
FIG. 7a shows a plan view of a resonator modulator according to one embodiment.
Figure 7B:
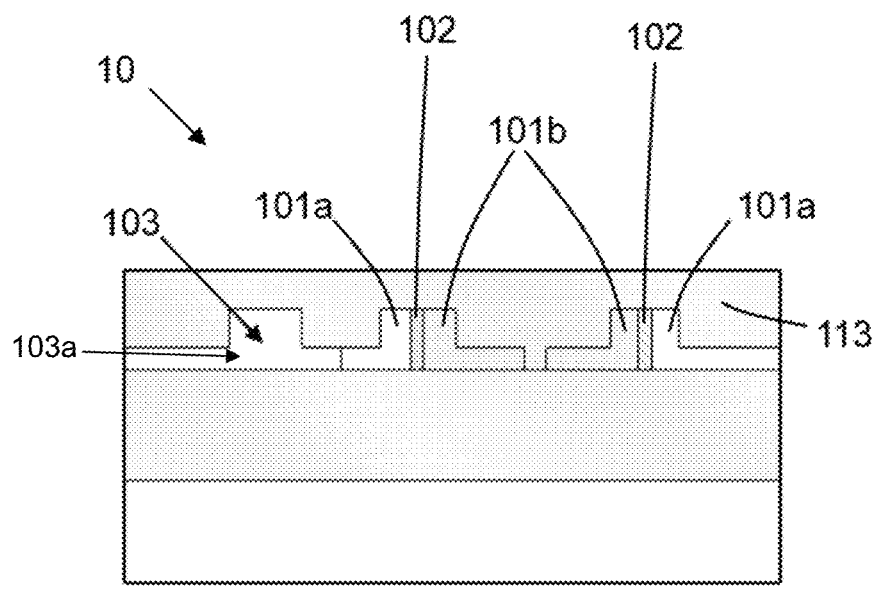
Figure 8A:
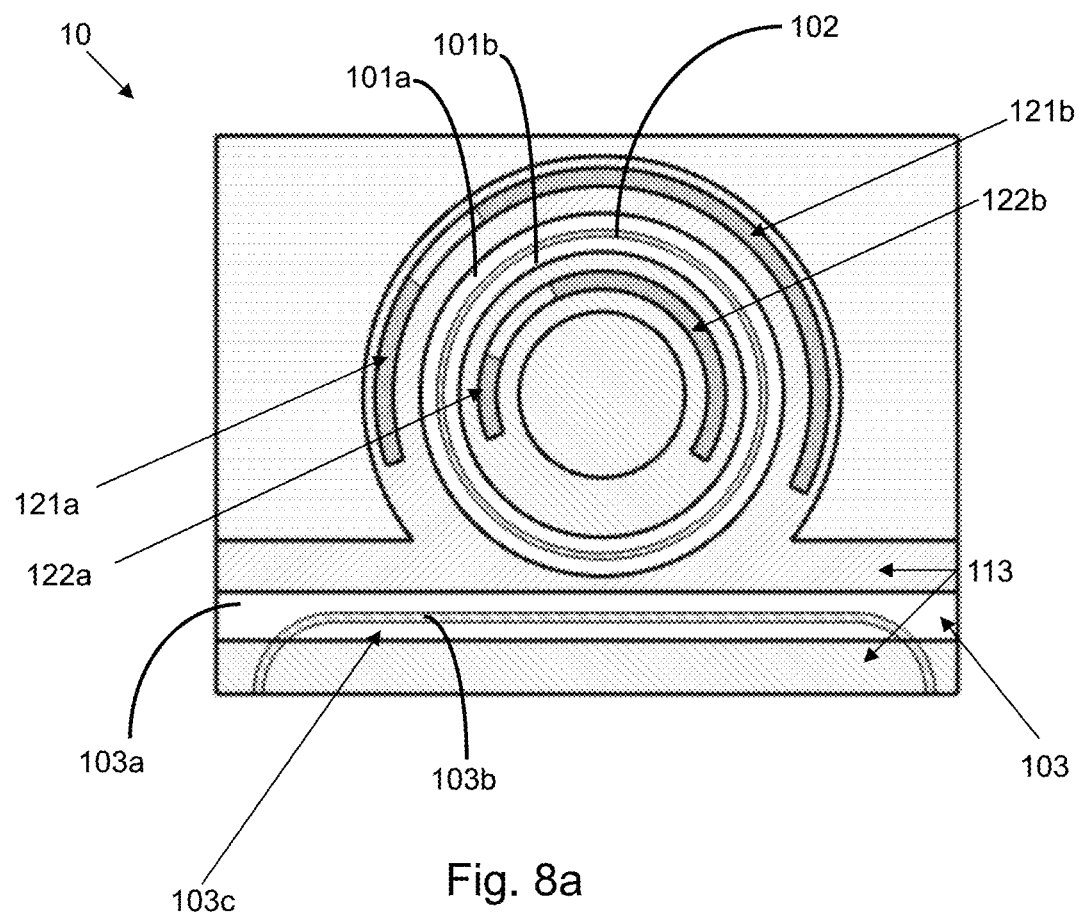
Figure 8B:
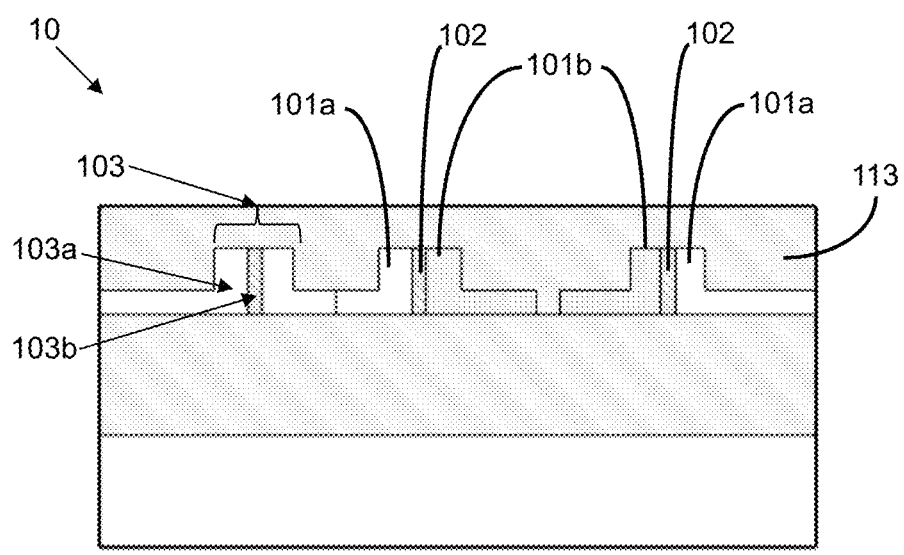

FIG. 7a and FIG. 8a both show plan views of different embodiments of the resonator modulator (10) when viewed from above the modulator (10) in a direction, along the central axis A, and towards the top surface of the modulator (10). FIG. 7b shows a section of view of the resonator modulator (10) shown in FIG. 7a, and FIG. 8b shows a section of view of the resonator modulator (10) shown in FIG. 8a.

Referring to the embodiments shown in FIG. 7a, FIG. 7b, FIG. 8a, and FIG. 8b, the modulator (10) is optically coupled to one or two or more waveguides, such as an input/output waveguide (103). The input/output waveguide (103) is also referred to as a "bus waveguide" and can be chosen as a capacitor waveguide for easy light coupling with ring resonator modulator (10) in order to benefit from loss-less mode converters from rib waveguide to capacitor-rib waveguide. Further benefits are that there is wave vector matching between the bus waveguide and resonator, which allows efficient energy exchange/coupling within a compact sized modulator/bus waveguide region, and also allows large coupling gaps between them.

The waveguide (103) is positioned adjacent to the modulator (10), and runs in a direction perpendicular to, and offset from, the central axis A. Light is configured to travel in both directions along the input/output waveguide (103). In this way, when referring to FIG. 7a and FIG. 8a, light is configured to travel in a direction that is either from left to right along the waveguide (103), or from right to left along the waveguide (103). When referring to FIG. 7b and FIG. 8b, light is configured to travel in a direction that is into the page along the waveguide (103), or out of the page along the waveguide (103).

In some embodiments, the waveguide (103) comprises either silicon (103a), or comprises silicon (103a), polysilicon (103c) and silicon dioxide (103b). In the embodiment shown in both FIG. 7a and FIG. 7b, the waveguide (103) is formed of silicon (103a) only. In the embodiment shown in both FIG. 8a and FIG. 8b, the waveguide (103) is formed of silicon (103a), polysilicon (103c), and a core (103b) formed of an oxide material, preferably silicon dioxide.

Referring to FIG. 7a and FIG. 8a, the outer conductive region (101a) is electrically coupled to a first pair of electrodes (121a, 121b) and the inner conductive region (101b) is electrically coupled to a second pair of electrodes (122a, 122b).

In use, modulation performed by the modulator (10) may be implemented in accordance with an input modulating signal received at the modulator (10) via connected control circuitry or a control processor (neither of which are shown in the figures). When a voltage signal is applied (e.g. in accordance with the input modulation signal), potential differences are applied in accordance with that voltage signals across the first pair of electrodes (121a, 121b) and the second pair of electrodes (122a, 122b), respectively. As a result, the potential difference is also applied to the outer conductive region (101a), as it is electrically coupled to a first pair of electrodes (121a, 121b), and the inner conductive region (101b), as it is electrically coupled to a second pair of electrodes (122a, 122b). This applied potential differences causes redistributions of the free charge carriers (electrons), which may be contained in both the outer conductive region (101a) and the inner conductive region (101b). In accordance with applied potential difference, the free charge carries move from the outer/inner conductive regions (101a, 101b) towards the ring-shaped insulating region (102). As the free charge carriers cannot pass through the ring-shaped insulating region (102) (as it is formed an electrically insulating material), they accumulate on either side of it and create a capacitor of the modulator (10). This charge accumulation produces a change in refractive index of the waveguide region of the modulator (10), which in turn modulates the propagating light in accordance with the modulating signal.

Referring to FIG. 7b and FIG. 8b, the modulator further comprises a cladding layer (113) configured to encapsulate the insulating region (102), the outer conductive region (101a), and the inner conductive region (101b). The cladding layer (113) is formed of an electrically insulating material and is designed to electrically isolate the different sides of the ring resonator modulator (10) in order to necessitate the formation, and maintenance of, the capacitor. For example, as shown in FIG. 7b and FIG. 8b, the cladding later (113) electrically isolates the opposing slabs in the inner conductive region (101b) so that there is no electrical contact with each other, and so that the charge accumulation, which occurs at the inner conductive region (101b) as previously described, cannot be short-circuited or lost.

Figure 9:
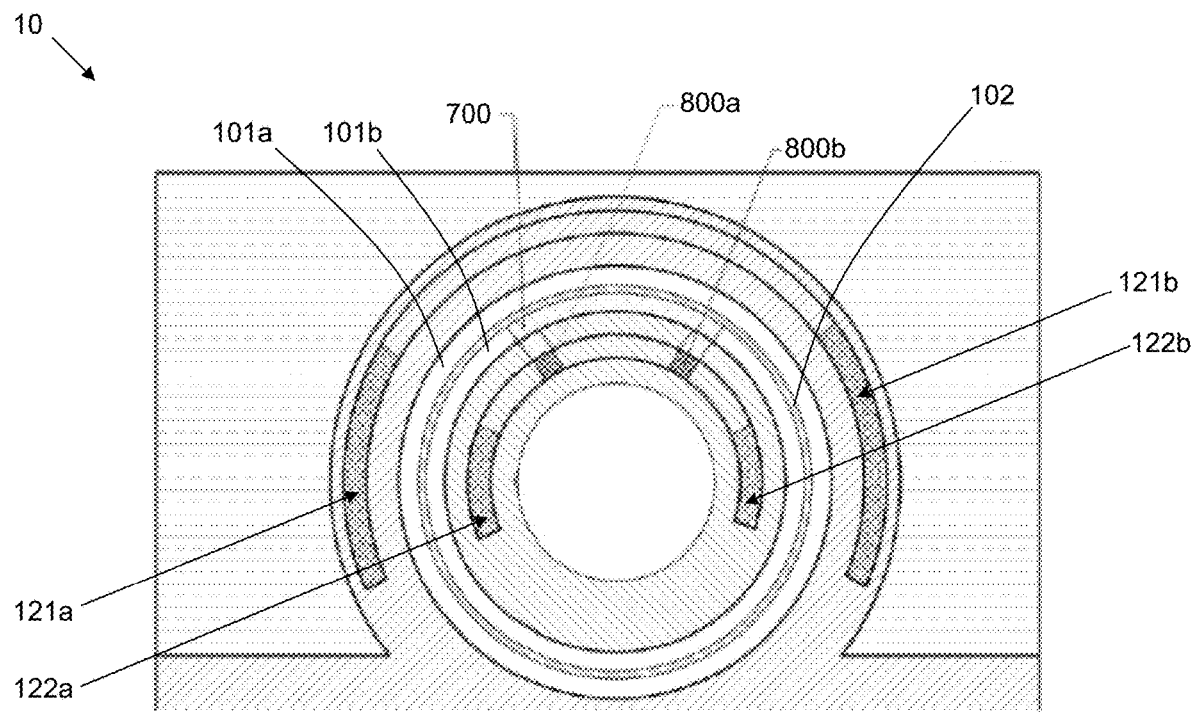
FIG. 9 shows a plan view of a resonator modulator according to one embodiment which includes doped regions.

FIG. 9 shows a plan view of a different embodiment of the resonator modulator (10) when viewed from above the modulator (10) in a direction, along the central axis A (not labelled), and towards the top surface of the modulator (10). In this embodiment, the inner conductive region (101b) comprises a doped region (700), where the doped region (700) is electrically powered, via a first contact (800a) and a second contact (800b), by voltage provided by the second pair of electrodes (122a, 122b).

Referring to FIG. 9, the doped region (700) is configured to generate heat in response to a voltage applied across the first contact (800a) and the second contact (800b). The doped region (700) is effectively an electric resistor which can generate heat when a voltage is applied across it, and is sometimes referred to in the art as a "heater" or a "doped semiconductor heater". The doped region (700) is isolated with the inner doped regions that connected with the second pair of electrodes (122a, 122b) by the undoped semiconductors between them. The dopants in the doped region (700) impair the flow of free charge carriers such that their electrical energy is converted into thermal energy, which generates heat. This heat generation helps modulate or control the resonance optical wavelength of the modulator (10) in accordance with the applied voltage. The doped region (700) is encapsulated by the electrically and thermally insulating cladding layer (103), thereby advantageously reducing any thermal dissipation from the doped region (700), as result of higher thermal wavelength detuning.

In other embodiments of the invention, the doped region (700) comprises: doped silicon, doped Si1-xGex, doped InP, or doped InGaAsP. As the skilled person will appreciate, in an alternative embodiment to the one shown in FIG. 9, the outer conductive region (101a) may comprise the doped region (700), where the doped region (700) is electrically coupled, via the first contact (800a) and the second contact (800b), to the first pair of electrodes (121a, 121b), and wherein the doped region (700) is configured to generate heat in response to a voltage applied across the first pair of electrodes (121a, 121b). The doped region (700) may be formed by ion injection into the outer conductive region (101a), or the inner conductive region (101b), or both. The doping can be formed during the material deposition as well in chemical vapour deposition (CVD) tools.

Figure 10:
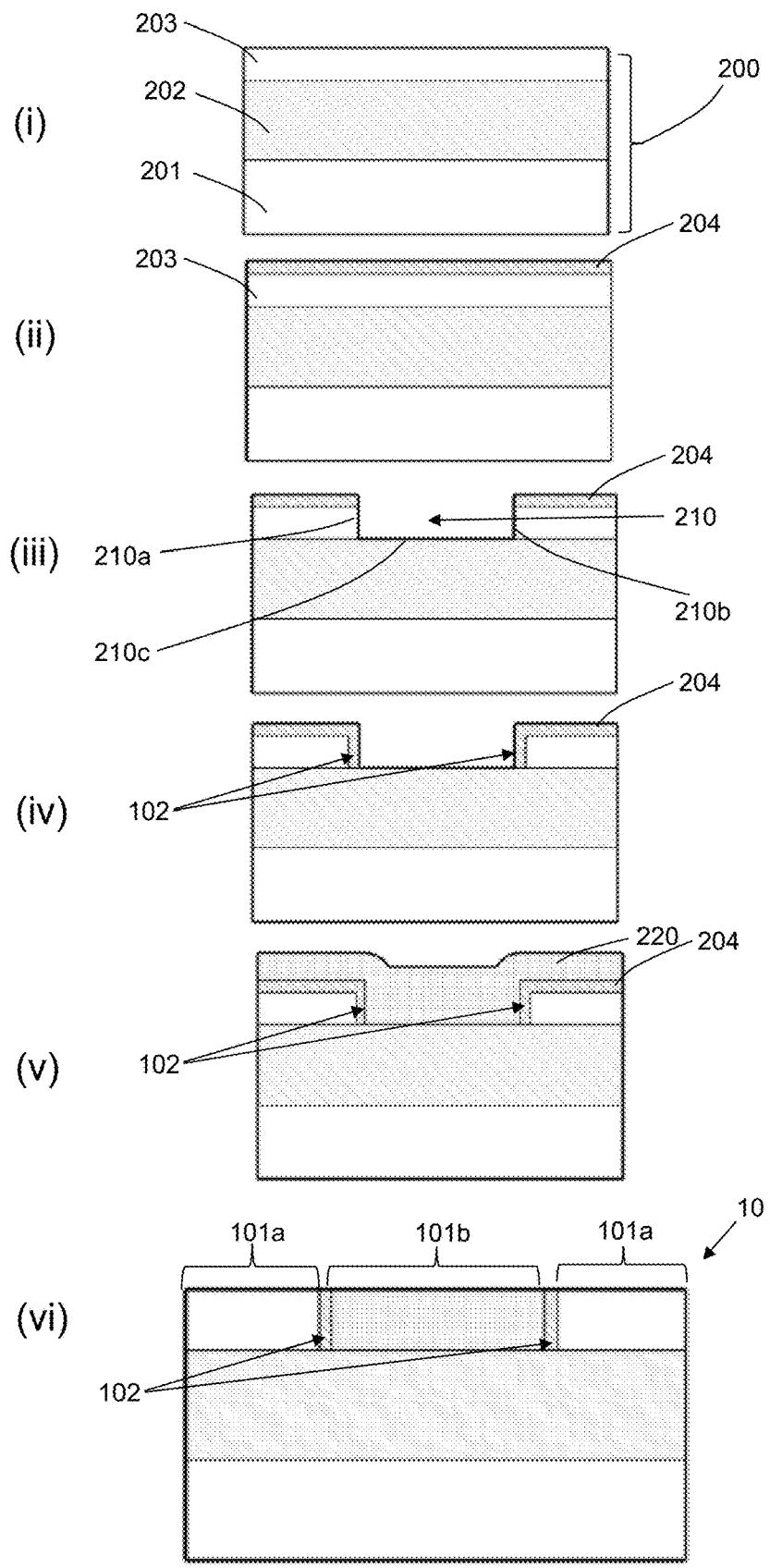
FIG. 10 illustrates method steps i) to vi) for manufacturing the resonator modulator shown in FIG. 1.

Method steps for manufacturing the embodiment of the modulator (10) shown in FIG. 1 are illustrated in FIG. 10. Referring to FIG. 10, the method of manufacturing comprises the following steps:

(i) providing a substrate (200) using techniques already known in the art, the substrate (200) comprising a semiconductor layer (203) on a underlaying layer (202) on a semiconductor substrate layer (201).

(ii) depositing or growing an insulating layer (204) onto the semiconductor layer (203) using techniques already known in the art.

(iii) etching through the insulating layer (204) and the semiconductor layer (203) to the underlaying layer (202) to form a well (210), the well (210) comprising an inner wall (210a, 210b) and a base (210c) formed by the underlaying layer (202) using standard etching techniques.

(iv) depositing or growing an insulating material onto the inner wall (210a, 210b) to form a ring-shaped insulating region (102) using depositing or growth techniques already known in the art.

(v) depositing a polycrystalline semiconductor material (220) onto the insulating region (102) to fill the well (210) using techniques already known in the art.

(vi) a planarising step comprising removing a portion of the polycrystalline semiconductor material (220) and the insulating layer (204) to form a capacitor comprising the ring-shaped insulating region (102) sandwiched between an outer conductive region (101a) and an inner conductive region (101b), wherein the inner conductive region (101b) is formed of the polycrystalline semiconductor material (220) and the outer conductive region (101a) is formed of the crystalline material.

In one embodiment, the above-mentioned planarising step (vi) (and also shown in FIG. 10) will leave some residual polycrystalline semiconductor material (220) on top. Advantageously, depositing or growing the insulating material onto the inner wall (210a, 210b) in order to form a ring-shaped insulating region (102) (i.e. in method step (iv)) allows for a better control of the thickness of the ring-shaped insulating region (102), and better control of the angle it makes with the underlaying layer (202). By controlling the thickness and/or the angle in this way, an optimisation of the modulator's efficiency can be achieved.

In one embodiment of the method, the polycrystalline semiconductor material (220) comprises group IV semiconductor material polysilicon Si1-xGex, or a group III-V semiconductor material. In another embodiment, the group III-V semiconductor material includes one of: InP, or InGaAsP.

Figure 11:
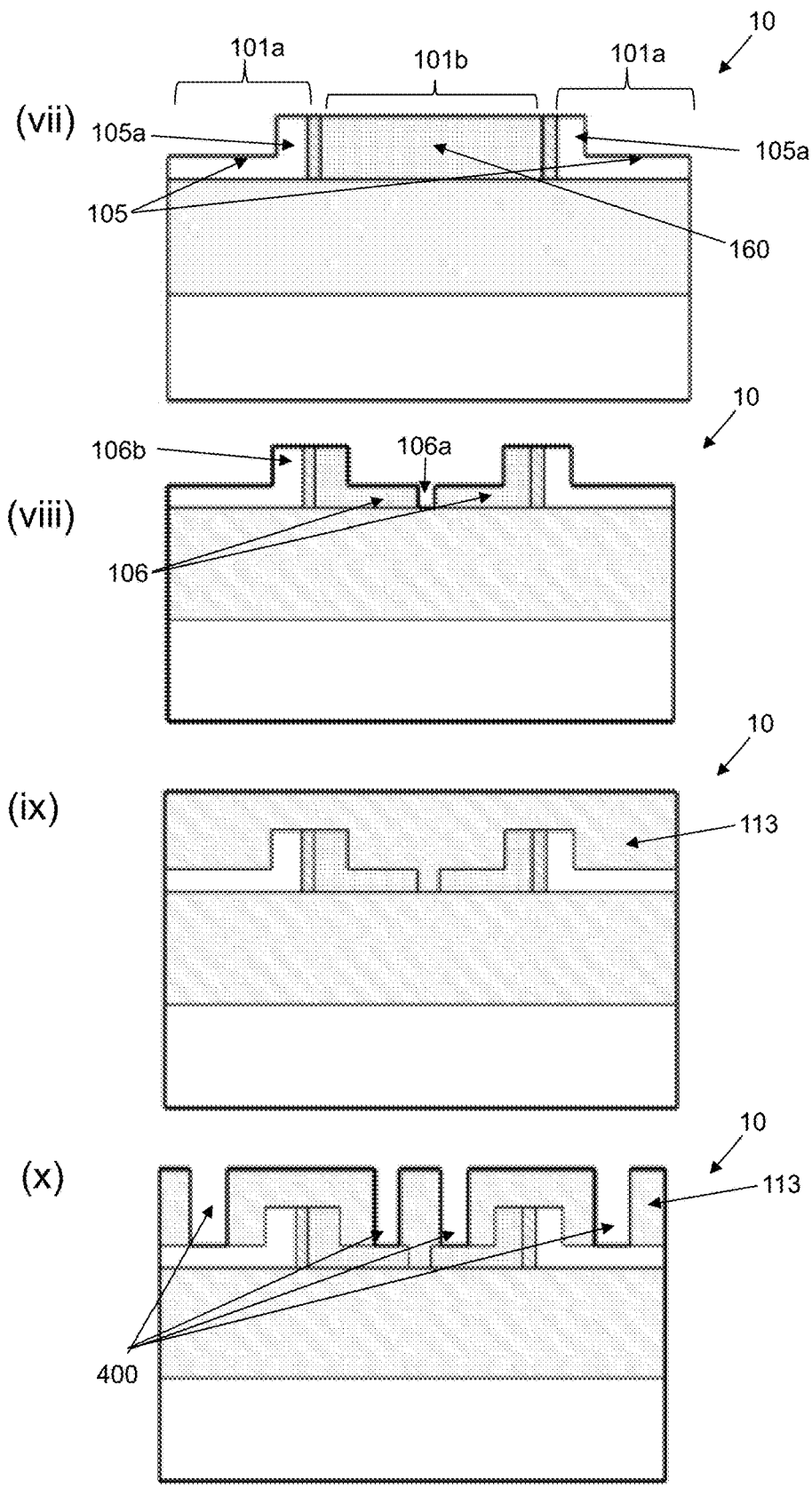
FIG. 11 illustrates method steps vii) to x) for manufacturing an embodiment of the resonator modulator with a cladding layer.

A further method step for manufacturing the embodiment of the modulator (10) shown in FIG. 2 is illustrated in step vii) of FIG. 11. Referring to FIG. 11, this further method step comprises:

(vii) a step of etching the outer conductive region (101a) to form an outer waveguide portion (105a) and a conductive outer slab (105), and wherein the inner conductive region (101b) is left un-etched to form a conductive polycrystalline inner disk (160).

Advantageously, the inner conductive region (101b) is not etched in order to keep a thicker polycrystalline inner disk (160) in the centre. This can reduce the resistance to injected carriers into the capacitor quicker in comparison with etched versions. With shallow etched slab on two sides, the modulator's shape is a micro-disk. Further advantageously, micro-disk resonators have less optical losses and a higher Q-factor.

A further method step for manufacturing the embodiment of the modulator (10) shown in FIG. 3 is illustrated in step viii) of FIG. 11. Referring to FIG. 11, this further method step comprises:

(viii) a step of etching the inner conductive region (101b) to form a ring-shaped conductive inner slab (106) and a hole (106a) extending to the underlaying layer (202).

In one example, the step of etching the inner conductive region (101b) is performed via chemical etching. The etching may be anisotropic wet or dry etching, which can result in the modulator (10) having vertical sidewalls or sidewalls which are inclined at an angle. Advantageously, angled sidewalls can ensure that the optical mode is confined around insulating region (102).

Further method steps used for manufacturing another embodiment of the modulator (10) are shown in step ix) and step x) in FIG. 11. Referring to FIG. 11, these further method steps comprise:

(ix) a step of depositing a cladding layer (113) to encapsulate the insulating region (102), the outer conductive region (101a), and the inner conductive region (101b), and (x) a step of etching vias (400) through the cladding layer (113) and exposing a surface of the conductive outer slab (105) and the ring-shaped conductive inner slab (106).

Figure 12A:
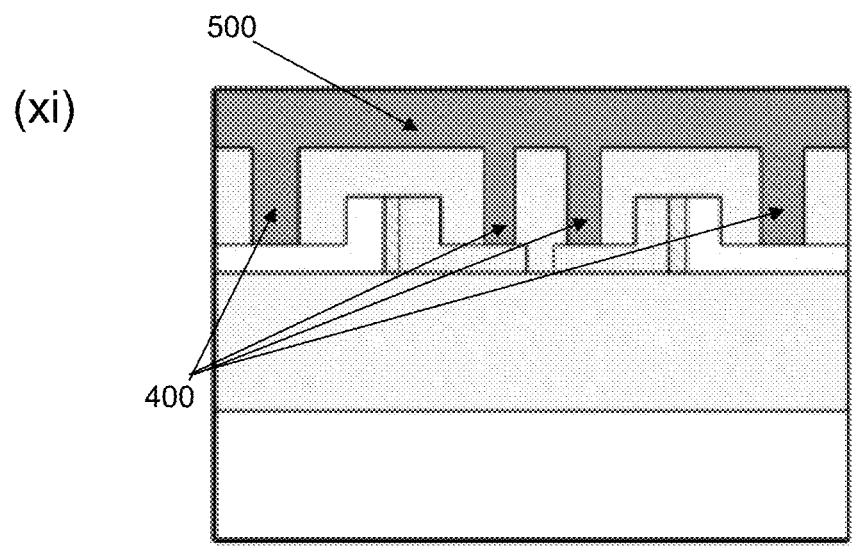
FIG. 12a illustrates method step xi) and FIG. 12b illustrates method step xii) for manufacturing an embodiment of the resonator modulator with metal electrodes.
Figure 12B:
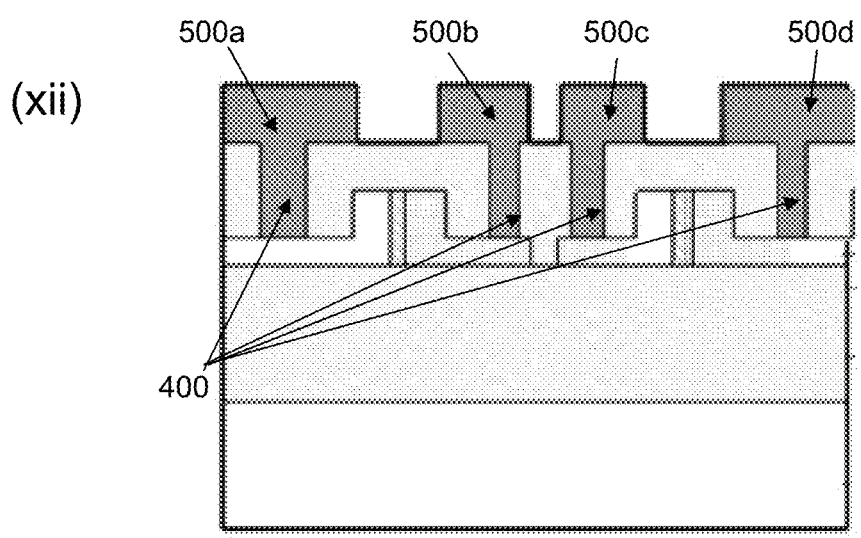

Further method step for manufacturing another embodiment of the modulator (10) are shown in step ix) in FIG. 12a and step x) in FIG. 12b. Referring to FIG. 12a and FIG. 12b, these further method steps further comprise:

(xi) a step of depositing a layer of metal (500) into the vias (400), and (xii) a step of etching the layer of metal (500) to form at least one electrode (500a, 500b, 500c, 500d) in each via (400).

In an example embodiment, the metal (500) used in the method step (xii) may be aluminium (Al) and/or copper (Cu).

Figure 13:
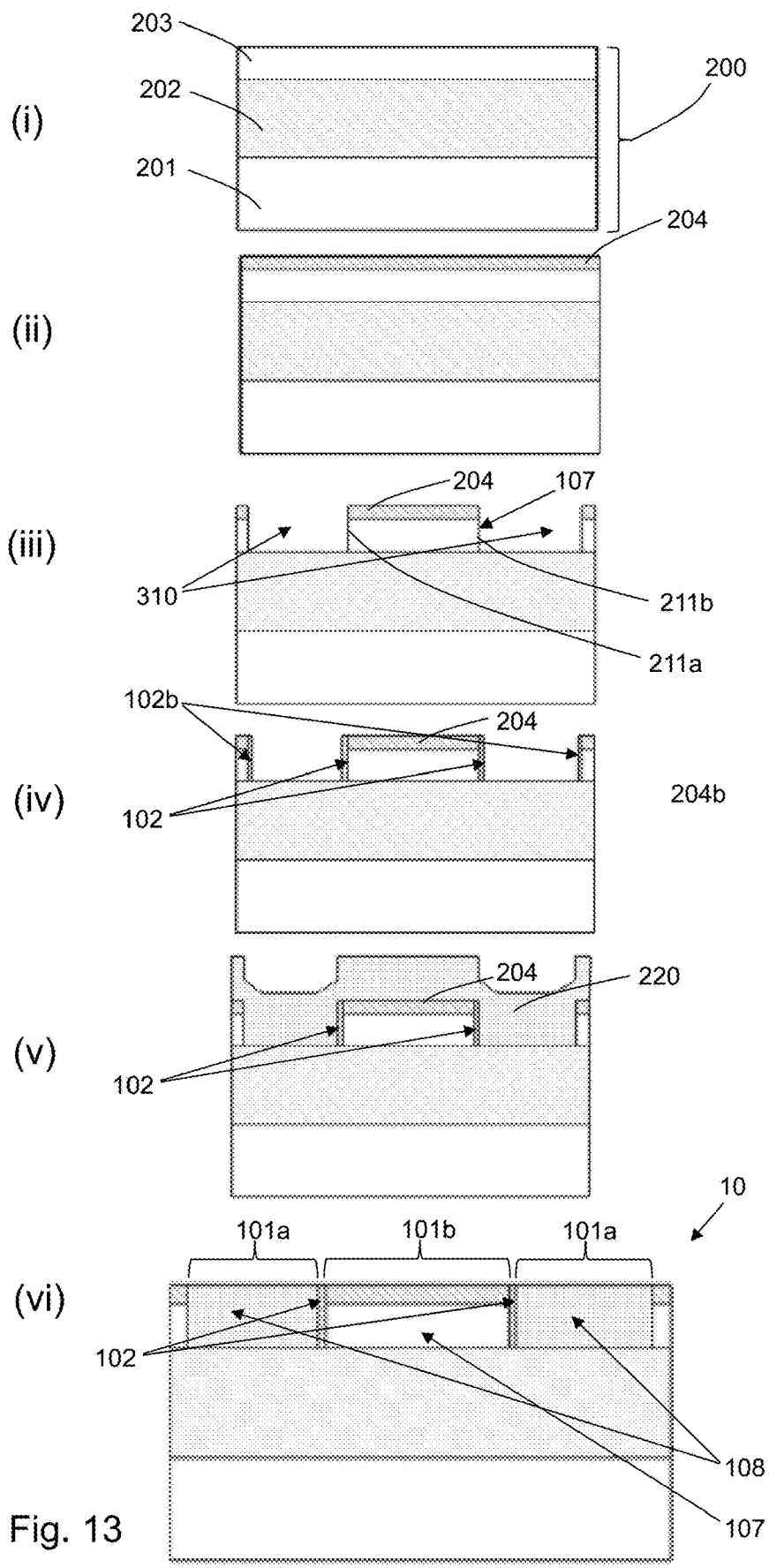
FIG. 13 illustrates method steps i) to vi) for manufacturing a resonator modulator shown in FIG. 4.

Method steps for manufacturing the embodiment of the modulator (10) shown in FIG. 4 are illustrated in FIG. 13. Referring to FIG. 13, the method of manufacturing comprises the following steps:

(i) providing a substrate (200), the substrate (200) comprising a semiconductor layer (203) on a underlaying layer (202) on a semiconductor substrate layer (201);

(ii) depositing or growing an insulating layer (204) onto the semiconductor layer (203), (iii) etching through the insulating layer (204) and the semiconductor layer (203) to the underlaying layer (202) to form an outer trench (310) and an inner disk (107) of crystalline material, the inner disk (107) comprising an outer wall (211a, 211b) surrounded by the outer trench (310);

(iv) depositing or growing an insulating material onto the outer wall (211a, 211b) to form a ring-shaped insulating region (102);

(v) depositing a polycrystalline semiconductor material (220) onto the insulating region (102) to fill the outer trench (310) and cover the insulating layer (204), and (vi) a planarising step comprising removing a portion of the polycrystalline semiconductor material (220) down to the level of the insulating layer (204) to form a capacitor comprising the ring-shaped insulating region (102) sandwiched between an outer conductive region (101a) and an inner conductive region (101b), wherein the outer conductive region (101a) is formed of the polycrystalline semiconductor material (220) and the inner conductive region (101b) is formed of the crystalline material.

Depositing, etching, growing and planarization steps may use standard techniques known to the skilled person. Optionally, in step (iv) another insulating layer (102b) may be deposited/grown onto sidewalls that are located opposite to the ring-shaped insulating region (102), as is shown in FIG. 13. Further optionally, this insulating layer (102b) may either be selectively removed (as is shown in step (v) in FIG. 13), or maintained on these sidewalls.

Figure 14:
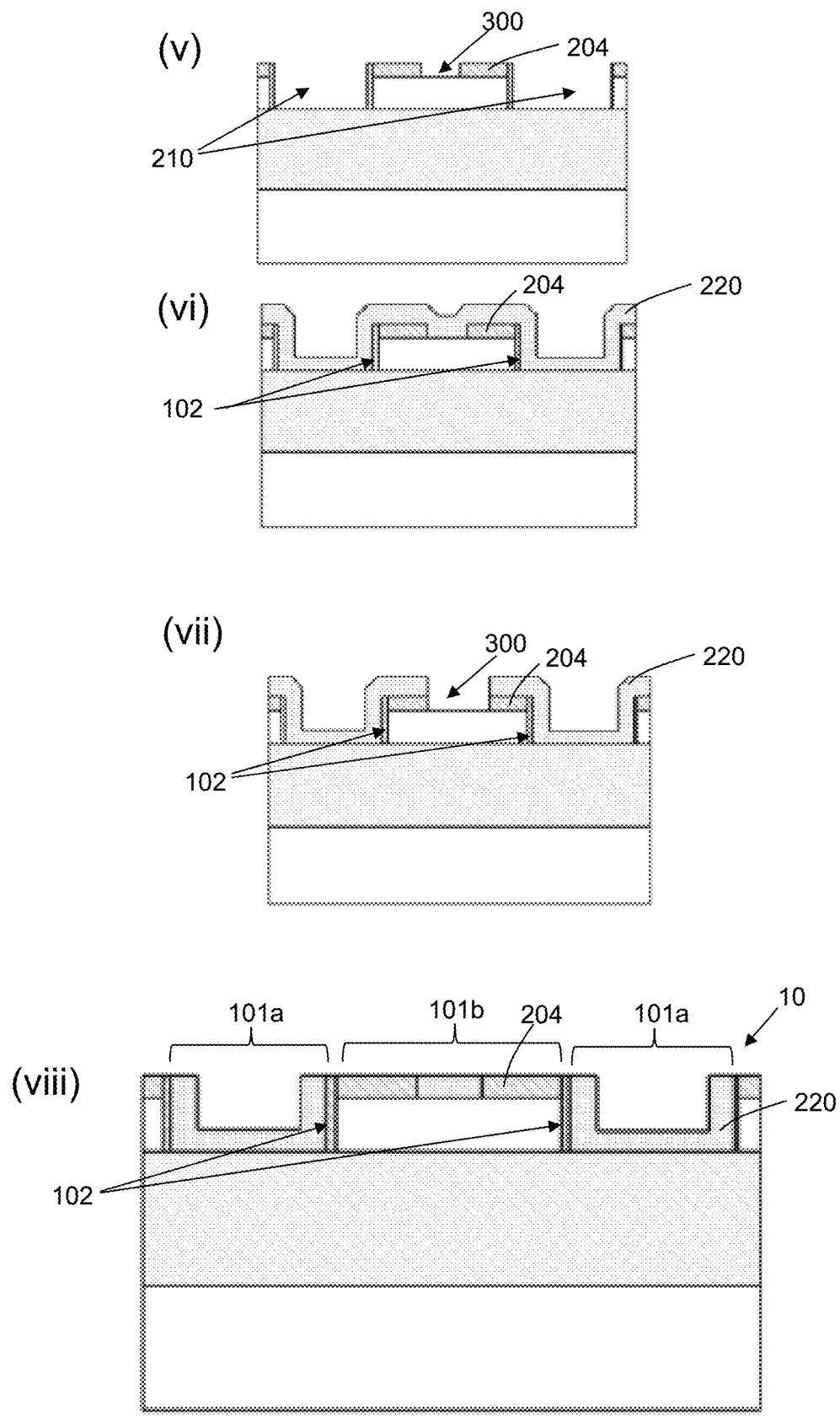
FIG. 14 illustrates method steps v) to viii) for manufacturing a resonator modulator shown in FIG. 5b.

In other embodiments, the above-mentioned planarising step (vi) (also shown in FIG. 13) will leave some residual insulating layer on top of the crystalline layer. In this way, the planarising steps may not fully remove the thin insulator layers as shown in FIG. 13 and FIG. 14. Accordingly, the embodiments shown in FIGS. 1 to 3 may have a thin insulator layer.

As previously discussed, this method of manufacture shown in FIG. 13 can be thought of as being the inverse of the method of manufacture shown in FIG. 10. This is because it forms a modulator (10) which has a polycrystalline outer ring (108) and inner disk of a crystalline material (107) as shown in the embodiment in FIG. 4 (as opposed to having a crystalline outer ring (104) and a polycrystalline inner disk (160), as is the case in the embodiment shown in FIG. 1).

In an embodiment of the method illustrated in FIG. 13, the polycrystalline semiconductor material (220) comprises polysilicon or Si1-xGex, or a group III-V semiconductor material. In another embodiment, the group III-V semiconductor material includes one of: InP, or InGaAsP.

A further method step for manufacturing the embodiment of the modulator (10) shown in FIG. 5a further comprises the following method step: etching the outer conductive region (101a) to form a conductive outer rib waveguide (108a) and a conductive outer slab portion (108b).

A further method step for manufacturing the embodiment of the modulator (10) shown in FIG. 6 further comprises the following method step: etching the inner conductive region (101b) to form a conductive inner rib waveguide (111a) and a conductive inner slab portion (111b).

Method steps for manufacturing the embodiment of the modulator (10) shown in FIG. 5b are illustrated in FIG. 14. Referring to FIG. 14, the method of manufacturing comprises the following steps which are performed after the previously discussed method step iv) as illustrated in FIG. 13:

(v) etching a hole (300) in the insulating layer (204), the hole (300) extending to the inner disk (107), (vi) depositing the polycrystalline semiconductor material (220) to fill the hole (300) and partially fill the outer trench (310), (vii) etching away the polycrystalline semiconductor material (220) in the hole (300), and (viii) a planarising step that removes the polycrystalline semiconductor material (220) down to the level of the insulating layer (204) to form a capacitor comprising the ring-shaped insulating region (102) sandwiched between an outer conductive region (101a) and an inner conductive region (101b), wherein the outer conductive region (101a) is formed of the polycrystalline semiconductor material (220) and the inner conductive region (101b) is formed of the crystalline material.

In other embodiments, the above-mentioned planarising step (vi) (also shown in FIG. 13) will leave some residual polycrystalline semiconductor material (220) on top insulating layer on top of the crystalline layer.

The above-mentioned method steps (vii) and (viii) can be used to manufacture two different modulator designs. In this way, the above-mentioned step (viii) may be an optional step which can used to develop a modulator wherein the polysilicon above the inner disk (107) is planarized.

In an example embodiment, the above-mentioned method step (vi) (also shown in FIG. 14) of depositing the polycrystalline semiconductor material (220) to fill the hole (300) and partially fill the outer trench (310) is performed by a thin layer deposition of the polycrystalline material (220). In another embodiment of this method, the polycrystalline semiconductor material (220) is polysilicon which is deposited by thin film or thin layer deposition In any of the methods previously described, the semiconductor layer (203) may comprise a layer of silicon, the underlaying layer (202) may comprises a layer of silicon dioxide or a BOX layer, and the semiconductor substrate layer (200) may comprise a layer of silicon, collectively forming a silicon-on-insulator (SOI) wafer. As opposed to the polycrystalline semiconductor material (220) that is used in all of the previous mentioned methods, in one embodiment the semiconductor layer (203) belonging to the substrate (200) is a single crystal (crystalline) silicon layer which is either etched or left un-etched in the previously discussed methods of manufacturing in order to form:

the outer ring (104) in the modulator (10) shown in FIG. 1 the outer waveguide portion (105a) and the conductive outer slab (105) in the modulator (10) shown in FIG. 2 and FIG. 3 the inner disk (107) in the modulator (10) shown in FIG. 4, FIG. 5a, FIG. 5b, and the conductive inner waveguide (111a) and the conductive inner slab portion (111b) in the modulator (10) shown in FIG. 6

In an example embodiment of the present invention, the width of the insulating region, sandwiched between the outer conductive region and the inner conductive region, may be 60 nm or less, for example 8 nm or less, and even in some cases 2 nm or less or 1 nm or less.

Example dimensions for the various layers and portions are about 600 µm depth for semiconductor substrate layer, about 0.75 µm to 5 µm depth for the underlaying layer, and about 0.2 µm to 0.6 µm depth for the semiconductor layer. The term "depth" in this context refers to the vertical direction as depicted, i.e. the thickness of the layers in the direction of stacking. Other depths for the various layers may alternatively be used, depending on particular requirements for the final device.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention. All references referred to above are hereby incorporated by reference.

What is claimed is:

1. A resonator modulator for modulating light in a photonic circuit, the resonator modulator comprising:
a capacitor formed of a ring-shaped insulating region sandwiched between an outer conductive region and an inner conductive region, wherein at least one of the outer conductive regions or the inner conductive regions is a polycrystalline semiconductor material; and
wherein the outer conductive region extends laterally outwards from the ring-shaped insulating region.

2. The resonator modulator of claim 1, wherein the polycrystalline semiconductor material comprises polysilicon, Si1-xGex, or a group III-V semiconductor material.

3. The resonator modulator of claim 2, wherein the group III-V semiconductor material includes one of: InP, or InGaAsP.

4. The resonator modulator of claim 1, wherein the inner conductive region comprises a polycrystalline inner disk and the outer conductive region comprises a crystalline semiconductor outer ring.

5. The resonator modulator of claim 1, wherein the outer conductive region comprises an outer waveguide portion and a conductive outer slab.

6. The resonator modulator of claim 1, wherein the inner conductive region comprises a ring-shaped inner waveguide portion and a ring-shaped conductive inner slab.

7. The resonator modulator of claim 1, wherein the inner conductive region comprises a layer of oxide material on an inner disk of a crystalline material, and the outer conductive region comprises a polycrystalline outer ring.

8. The resonator modulator of claim 7, wherein the polycrystalline outer ring comprises a ring waveguide portion.

9. The resonator modulator of claim 8, wherein the layer of oxide material has a ring shape, defining a central hole region filled with a deposited semiconductor material.

10. The resonator modulator of claim 8, wherein the inner disk and the oxide material are etched to form a conductive inner waveguide and a conductive inner slab portion.

11. The resonator modulator of claim 1, wherein the resonator modulator is optically coupled to one or two or more waveguides.

12. The resonator modulator of claim 1, wherein the outer conductive region is electrically coupled to a first pair of electrodes and the inner conductive region is electrically coupled to a second pair of electrodes.

13. The resonator modulator of claim 12, wherein the inner conductive region further comprises a doped region, wherein the doped region is electrically coupled, via a first contact and a second contact, and wherein the doped region is configured to generate heat in response to a voltage applied across the second pair of electrodes.

14. The resonator modulator of claim 13, wherein the doped region comprises: doped silicon, doped Si1-xGex, doped InP, or doped InGaAsP.

15. The resonator modulator of claim 1, wherein the resonator modulator further comprises a cladding layer configured to encapsulate the ring-shaped insulating region, the outer conductive region, and the inner conductive region.

16. A method of fabricating a resonator modulator of claim 1, the method comprising the following steps:
providing a substrate, the substrate comprising a semiconductor layer on a underlaying layer on a semiconductor substrate layer;
depositing or growing an insulating layer onto the semiconductor layer,
etching through the insulating layer and the semiconductor layer to the underlaying layer to form a well, the well comprising an inner wall and a base formed by the underlaying layer;
depositing or growing an insulating material onto the inner wall to form a ring-shaped insulating region;
depositing a polycrystalline semiconductor material onto the ring-shaped insulating region to fill the well, and
a planarising step comprising removing a portion of the polycrystalline semiconductor material and the insulating layer to form a capacitor comprising the ring-shaped insulating region sandwiched between an outer conductive region and an inner conductive region, wherein the inner conductive region is formed of the polycrystalline semiconductor material and the outer conductive region is formed of the crystalline material.

17. The method of claim 16, wherein the polycrystalline semiconductor material comprises polysilicon, Si1-xGex, or a group III-V semiconductor material.

18. The method of claim 17, where the group III-V semiconductor material includes one of: InP, or InGaAsP.

19. The method of claim 16, wherein the method further comprises:
a step of etching the outer conductive region to form an outer waveguide portion and a conductive outer slab, and wherein the inner conductive region is left unetched to form a conductive polycrystalline inner disk.

20. The method of claim 16, wherein the method further comprises:
a step of etching the inner conductive region to form a ring-shaped conductive inner slab and a hole extending to the underlaying layer.

21. The method of claim 16, wherein the method further comprises:
a step of depositing a cladding layer to encapsulate the ring-shaped insulating region, the outer conductive region, and the inner conductive region, and
a step of etching vias through the cladding layer and exposing a surface of the conductive outer slab and the ring-shaped conductive inner slab.

22. The method of claim 21, wherein the method further comprises:
a step of depositing a layer of metal into the vias, and
a step of etching the layer of metal to form at least one electrode in each via.

23. The method of claim 16, wherein: the semiconductor layer comprises a layer of silicon, the underlaying layer comprises a layer of silicon dioxide or a BOX layer, and the semiconductor substrate layer comprises a layer of silicon, collectively forming a silicon-on-insulator (SOI) wafer.

24. A method of fabricating a resonator modulator of claim 1, the method comprising the following steps:
providing a substrate, the substrate comprising a semiconductor layer on a underlaying layer on a semiconductor substrate layer;
depositing or growing an insulating layer onto the semiconductor layer,
etching through the insulating layer and the semiconductor layer to the underlaying layer to form an outer trench and an inner disk of crystalline material, the inner disk comprising an outer wall surrounded by the outer trench;

depositing or growing an insulating material onto the outer wall to form a ring-shaped insulating region;

depositing a polycrystalline semiconductor material onto the ring-shaped insulating region to fill the outer trench and cover the insulating layer, and a planarising step comprising removing a portion of the polycrystalline semiconductor material down to the level of the insulating layer to form a capacitor comprising the ring-shaped insulating region sandwiched between an outer conductive region and an inner conductive region, wherein the outer conductive region is formed of the polycrystalline semiconductor material and the inner conductive region is formed of the crystalline material.

25. The method of claim 24, wherein the polycrystalline semiconductor material comprises polysilicon, Si1-xGex, or a group III-V semiconductor material.

26. The method of claim 25, where the group III-V semiconductor material includes one of: InP, or InGaAsP.

27. The method of claim 26, wherein the method further comprises the step of etching the inner conductive region to form a conductive inner rib waveguide and a conductive inner slab portion.

28. The method of claim 26, further comprising, after depositing or growing an insulating material onto the outer wall to form the ring-shaped insulating region:

etching a hole in the insulating layer, the hole extending to the inner disk;

depositing the polycrystalline semiconductor material to fill the hole and partially fill the outer trench;

etching away the polycrystalline semiconductor material in the hole, and a planarising step that removes the polycrystalline semiconductor material down to the level of the insulating layer to form a capacitor comprising the ring-shaped insulating region sandwiched between an outer conductive region and an inner conductive region, wherein the outer conductive region is formed of the polycrystalline semiconductor material and the inner conductive region is formed of the crystalline material.

29. The method of claim 24, wherein the method further comprises the step of etching the outer conductive region to form a conductive outer rib waveguide and a conductive outer slab portion.

* * * * *